US009298741B1

(12) United States Patent
Strand et al.

(10) Patent No.: US 9,298,741 B1
(45) Date of Patent: Mar. 29, 2016

(54) CONTEXT-SPECIFIC ELECTRONIC MEDIA PROCESSING

(71) Applicant: AMAZON TECHNOLOGIES, INC., Seattle, WA (US)

(72) Inventors: William Alexander Strand, Sammamish, WA (US); Arnab Sanat Kumar Dhua, Mountain View, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/316,454

(22) Filed: Jun. 26, 2014

(51) Int. Cl.
G06K 9/00 (2006.01)
G06F 7/00 (2006.01)
G06F 17/30 (2006.01)
G06T 3/40 (2006.01)
G06T 11/00 (2006.01)

(52) U.S. Cl.
CPC ...... G06F 17/30244 (2013.01); G06F 17/3005 (2013.01); G06F 17/30991 (2013.01); G06T 3/4092 (2013.01); G06T 11/001 (2013.01)

(58) Field of Classification Search
CPC ................... G06F 17/3005; G06F 17/30991
USPC ................... 382/162, 305; 707/602, 722, 736
See application file for complete search history.

(56) References Cited

U.S. PATENT DOCUMENTS

| | | | |
|---|---|---|---|
| 2003/0198458 A1* | 10/2003 | Greenwood | 386/46 |
| 2005/0265345 A1* | 12/2005 | Chen et al. | 370/392 |
| 2006/0035610 A1* | 2/2006 | Potrebic | 455/178.1 |
| 2007/0067493 A1* | 3/2007 | Issa | 709/246 |
| 2007/0213048 A1* | 9/2007 | Trauberg | 455/432.3 |
| 2008/0184260 A1* | 7/2008 | Grayson | 719/313 |
| 2009/0097414 A1* | 4/2009 | Yoon et al. | 370/254 |
| 2010/0142829 A1* | 6/2010 | Guleryuz et al. | 382/209 |
| 2010/0250581 A1* | 9/2010 | Chau | 707/769 |
| 2011/0221965 A1* | 9/2011 | Mitchell et al. | 348/575 |
| 2012/0027250 A1* | 2/2012 | Omer et al. | 382/103 |
| 2012/0081382 A1* | 4/2012 | Lindahl et al. | 345/581 |
| 2012/0331438 A1* | 12/2012 | Moskal et al. | 717/100 |
| 2013/0125155 A1* | 5/2013 | Bhagavathy et al. | 725/10 |
| 2013/0136316 A1* | 5/2013 | Grassel et al. | 382/115 |
| 2013/0166391 A1* | 6/2013 | Blow et al. | 705/14.66 |
| 2013/0229434 A1* | 9/2013 | Ofek et al. | 345/634 |
| 2014/0164938 A1* | 6/2014 | Petterson et al. | 715/739 |
| 2014/0187315 A1* | 7/2014 | Perry | 463/29 |
| 2015/0029353 A1* | 1/2015 | Sinn et al. | 348/222.1 |

OTHER PUBLICATIONS

Bakhshandeh et al. ("Degrees of Separation in Social Networks," Proceedings of the 4th Int'l Symposium on Combinatorial Research, 2011).*

* cited by examiner

Primary Examiner — Yubin Hung
(74) Attorney, Agent, or Firm — Lindauer Law, PLLC

(57) ABSTRACT

Media objects, such as photographs, music, or videos are modified based on a process that first identifies conditions associated with either the media object itself or a characteristic of a request for the media object. Conditions associated with the media object may include an age of the media object or a number of times the media object has been accessed. The characteristic of the request for the media object may include a geographic or logical location from which the request originated. The second step makes predetermined alterations to the media object based on how the conditions match rules for processing the media object. The alterations may include reductions in fidelity or quality, changes in color, selective blurring, such as faces, or changing how much of a music or video media object is presented.

18 Claims, 16 Drawing Sheets

— 432    — 430

Click here to add a media object
                                            — 434
    Currently selected: Image 065

436 —
    Select Alteration criteria:
    ☐ Location
        Enter city/state or zip code [_____]
        Current | Photo
        ○ Screen by user data
        ● Screen by IP address
        Miles from location or # IP hops [_____]

438 —
    ☐ Identity of requestor
        ● Request login
        ○ Use social media identity
        Enter name(s): [_____]  Deg. Separation [____]

440 —
                    — 442    — 444
    ☐ Age of media object
        Degrades [5% ▼] per [month ▼]

446 —
    [x] Number of accesses of media object
        Degrades [1% ▼] per [10 ▼] accesses
                    — 448       — 450

Continue to set alteration

452 —
                                    Fig. 13

CONTEXT-SPECIFIC ELECTRONIC MEDIA PROCESSING

BACKGROUND

Electronic media objects are distributed among computer systems through many different mechanisms. Images, music, and videos are accessed by millions of people each day. In some cases, access to the media object is blocked if a user does not have access privileges; in other cases, such as for images, different forms of the image may be distributed based on the capability of the device viewing the image including screen size or a particular browser.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 13 depicts an aspect of a user interface for associating rules with a media object, according to one embodiment;

Figure 1:
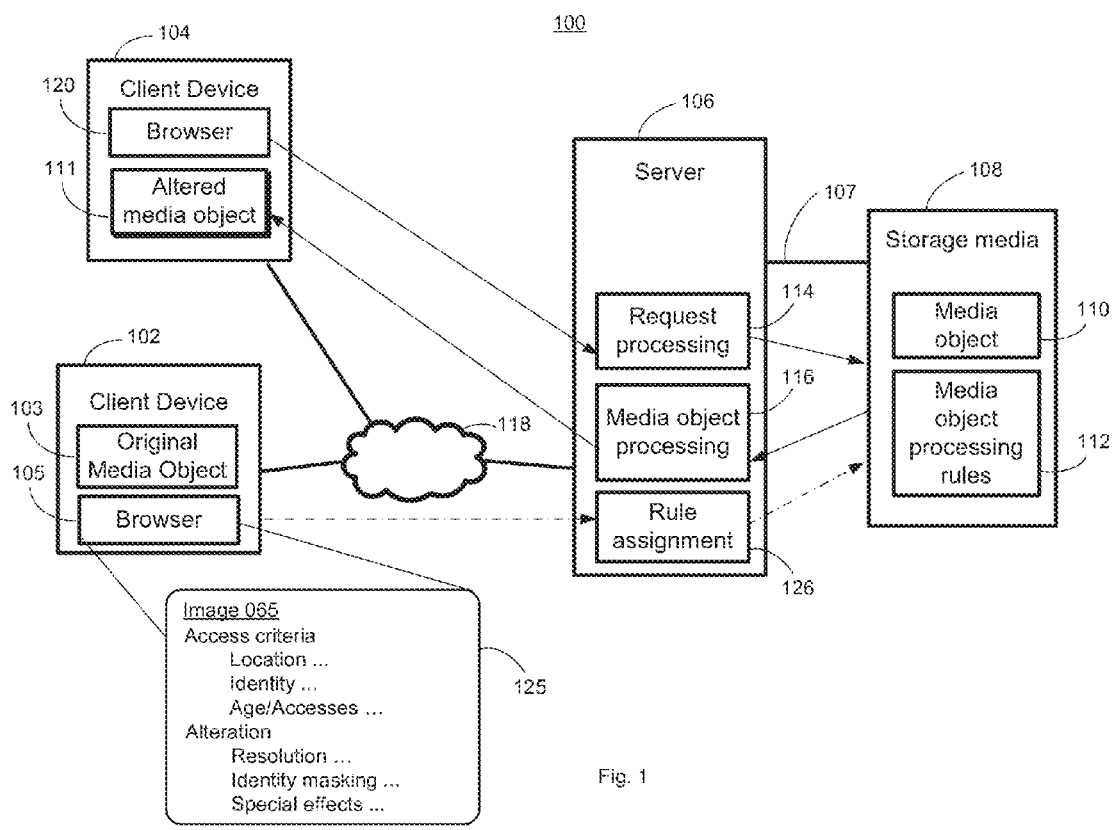
FIG. 1 is a block diagram of a system configured for contextual processing of electronic media objects, according to one embodiment.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein. For the purpose of illustration, representations of photographic images will generally be used to illustrate the concepts disclosed herein, but other electronic media objects are amenable to corresponding modifications as also discussed below. Unless contradicted by the teachings of this disclosure, non-conflicting elements of different embodiments may be implemented together in a single embodiment.

DETAILED DESCRIPTION

The sharing of images, music, videos, and other electronic media objects is a common practice among people having an electronic device and access to a network. Over the years, electronic media object providers have become sophisticated at accommodating different types of devices and their associated browsers used to consume the electronic media objects. Such devices may include, without limitation, televisions, monitors, desktop computers, laptop computers, tablet computers, e-book readers, and cell phones. In these cases, content providers may maintain different versions of viewable media objects, with each version being optimized for a different screen size or resolution. Alternatively, streaming services may connect a user to different streams (e.g., deliver audio and video with different frame and bitrates) based on the bandwidth of a user's network connection.

However, other than limiting access to media objects to only those within a specific circle of friends or registered users, content owners have not been able to specify how their media content is presented, for example, to protect personal information or to create a specific effect.

Limiting media object access to certain pre-defined users can be cumbersome to administer in that it requires the content owner to either specify individually each user capable of access, or to accept as "friends" those who might not otherwise be selected simply so that a particular group of images or other media objects could be shared. For example, it may be desirable to distribute pictures from a holiday party to coworkers, but posting on a public website may not be acceptable to everyone. Conversely, not everyone in attendance may have an account on a particular media object-sharing site to gain access to this one set of photos.

A person posting photographs may specify criteria by which the images are available. For example, with reference to the holiday party example above, a person posting the holiday party photographs may specify one or more criteria under which access to the images will be allowed. In addition, the poster may specify one or more alterations to be made to the photographs for those that do not meet the criteria. For example, a set of photographs may be made available at full resolution to any entity whose request originates from a particular geographic region or Internet Protocol (IP) address associated with the region. However, a request originating from an area beyond that particular region may result in access to the photographs at a reduced resolution or with particular identifiable features such as faces or addresses blurred. In this case, requesters who make a request from within the defined geographic region may access the photographs while requesters outside the defined geographic region receive photographs with individually identifiable information masked or removed.

For example, if a user specifies the geographic region to be a county, such as Ada County, Idaho, a request made from Boise, Idaho, will meet the geographic criteria, and the requested media object, e.g. photograph, may be supplied at full resolution. However, if a request originates in Mountain Home, Id., or Albany, N.Y., or London, England, the media object may be altered according to the rules, in this case, to have faces or addresses blurred. In another embodiment, the geographic area could be larger so that anyone in Canada gets a full resolution photograph and anyone outside of Canada receives the altered photograph. Alternatively, a comparison of the location of the content owner and a location of the device making the request may be made and when that distance is less than a specified distance, e.g., 50 miles, the full resolution photograph may be supplied. This technique can also be applied to other media object types beyond photographs, such as videos, music, and artwork.

Selective access or modification of media objects can be applied to other access criteria, including a login identity of a requestor or a characteristic of an email address, phone number, text message identifier, or social network account/address associated with the request.

The one or more access criteria may not pertain to the requestor but to one or more characteristics of the media object itself. For example, consider a content owner or provider that rewards close followers with special content. After posting a new item, such as a photo, video, or music offering, each successive retrieval of the object reduces the quality of the product delivered. To use a photograph example, the first ten accesses of the photograph may be served at full fidelity, while the next ten accesses are served by a slightly reduced resolution copy of the object. The process may continue until further attempts to access the object are either denied or are provided with an extremely poor quality copy of the photograph. In the case of music, the quality may be reduced, for example, by reducing the sampling rate, frequency range, or other audible characteristic. Alternatively, the sound quality may be maintained, but the quantity may be reduced so that requests for the object after a predefined expiration period receive only a short clip of the music.

The age of the media object in contrast to the number of times the media object has been accessed may be the media object characteristic used to establish the quality of the delivered media object. For example, unlike photograph messaging services that cause images to disappear after a fixed time, an image or other media object may simply degrade as it is accessed over time, reflecting perhaps, the reduced relevance of the subject matter over time. The effect may be highlighted, for example, by applying an aging algorithm to the media object to make it look as if it were an old physical item. In the case of a photograph, the image may show artificial wrinkles or torn edges. In the case of music or video, scratches and static may be introduced simulating old film or a scratched vinyl record.

In some cases, the actual visual content of the media object may be analyzed as part of the process of determining how it should be altered. For example, a media object may be classified by personally identifiable information, such as whether a human face is visible or if the time, street signs, house addresses, license plate numbers, geolocation information, financial information, or other personally identifiable information are included in the media object. A rule assignment service may facilitate this process.

Enforcement of the alterations may be executed in any of a number of ways. A server may alter the media object as it is retrieved, based on characteristics of the request or rules for the media object itself. In another embodiment, a media player with an intermediary function may evaluate the applicable criteria and enforce rules at a client device in presenting the media object. In yet another embodiment, a self-contained media object alters itself or a presentation of itself after evaluating the access conditions and applying internally-stored rules prior to presentation. These and other alternatives are discussed in more detail below.

As noted above, FIG. 1 is a block diagram of a system 100 configured for contextual processing of electronic media objects 110 (sometimes simply referred to as media objects) in accordance with an embodiment. In particular, FIG. 1 illustrates a first client device 102, a second client device 104, and a server 106 connected via network 118. The server 106 may be in communication with a storage medium 108 via a data connection 107.

When a user associated with an original media object 103 wishes to share the media object 103 using context-specific media processing, the user may connect to a rule assignment service 126 on the server 106, e.g., using a browser 105. In an embodiment, the user may be able to transfer the original media object 103 to the storage medium 108, embodied as media object 110, and to develop one or more media object processing rules 112 that will be used to process requests for the media object 110. In other embodiments, such as those implemented on a smartphone, an application may provide the user interface and communication support associated with uploading media objects 110 and developing rules 112.

The rule assignment service 126 may support a user interface 125 on the client device 102, for example, via the browser 105. A user may wish to allow full image access to one group of users and access only to altered images for another group of users. In one case, the user may want to allow access based on location, so that only users from a particular region can access the full fidelity media object 110. In another case, the user may want to be more specific about who can access the media object 110 and restrict full fidelity access to certain people by name or other identifier, such as a social media handle. While the location and identity qualifiers may provide a security aspect, other qualifiers that can be specified by the user interface 125 may encourage prompt access or provide the media object 110 with an aspect of impermanence; for example, the age of the media object 110 or the number of times the media object 110 has already been accessed may be used to determine the fidelity of the media object 110 provided in response to a current request.

The user interface 125 may also allow the user to specify what modifications to make to the media object 110 if a full fidelity copy is not to be provided, based on specified conditions, occurrences, or triggers. If location or identity are the basis for conditional access (e.g., because the user or content owner is concerned about security), the user may specify that less than full resolution copies will be supplied or that personally identifiable information, such as faces or geolocation information, will be masked. However, if the user is creating a temporal aspect to the object (e.g., for a game or competition), media objects 110 may be made available at higher resolution to those who are earliest in making their requests or who have made their request within a predetermined period of time.

Subsequently, another user at client device 104 may request access to the media object 110. The server 106 may determine appropriate characteristics of the request and/or the media object 110 and apply any alterations designated for the media object 110 before creating and sending an altered media object 111 to the client device 104 for presentation to the user by an appropriate user interface device.

In various embodiments, the alterations may cause photographs to have their resolution reduced in part or in full, may cause particular areas of a photograph to be blurred or otherwise rendered unrecognizable (e.g., with respect to faces, house numbers, and license plate numbers), may cause changes in size, color depth or color scheme, may add or remove geolocation and/or other metadata, or may artificially age the media object's 110 visual representation. Similarly, music or other audio media objects 110 may have their resolution or bitrate reduced, may be shortened, or may be artificially aged such as via the addition of static noise. In the case of video, resolution may be reduced, the length may be shortened, or artificial aging may be added (e.g., visual artifacts and audio static noise). These types of media objects and associated alterations are merely examples and other types of media objects and other alterations will be apparent to those of skill in the art and are deemed to fall within the scope of this disclosure.

Although FIG. 1 illustrates an example architecture, a distributed service architecture may be used so that the functions of the server 106 and storage medium 108 may be organized in various tiers, redundant sites, geographically distant sites, or separated into a number of logical components with each logical component served by separate processors.

The media object input flow is discussed in more detail below with respect to FIGS. 13-14. Generally referring to the embodiment illustrated in FIG. 1, a request made at the client device 104 for an electronic media object 110 may be received at the server 106. The request processing service 114 may identify criteria associated with the request in view of the media object processing rules 112 for the requested media object 110. If one or more criteria are met, the media object processing service 116 may retrieve or copy the media object 110 and make alterations according to the media object processing rules 112 to create and subsequently deliver an altered media object 111 to the client device 104 for presentation via the browser 120 or another media client such as an audio player. In other embodiments, the media objects 110 may include haptic or other sensory elements or instructions that interact with devices at the media client to create physical touch sensations, smell, or even taste.

Once received at the client device 104, the altered media object 111 may be presented by the client device. In the embodiment of FIG. 1, the altered media object 111 is a self-contained object and is ready for presentation by one or more viewers, players, plug-ins, or applications. As discussed above, virtually any electronic media object 110 may be supported in this manner with the alterations appropriate to the type of media, such as photographs, music, and videos. A variation of using a standard presentation approach is discussed in greater detail below with respect to FIG. 2.

Figure 2:
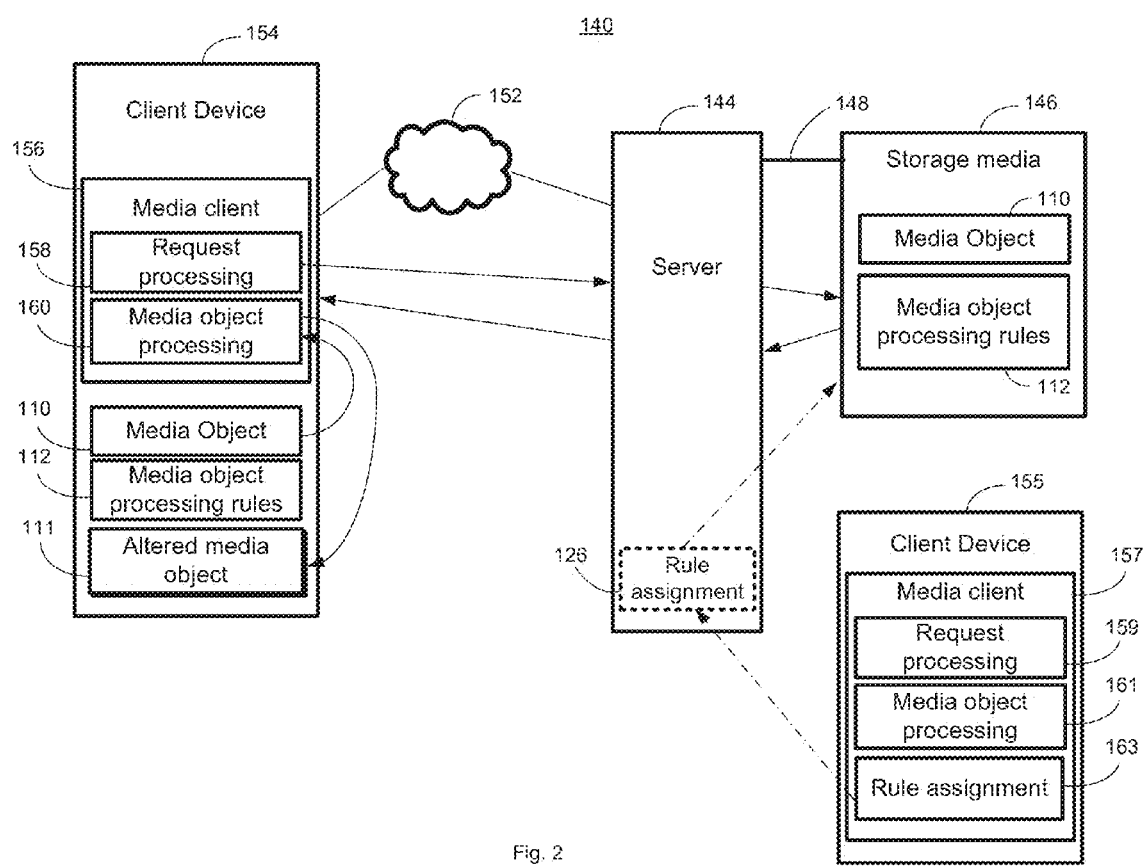
FIG. 2 is a block diagram of a system configured for contextual processing of electronic media objects, according to another embodiment.

In particular, FIG. 2 shows a block diagram of a system 140 configured for contextual processing of electronic media objects 110, according to another embodiment of the disclosed principles. In the illustrated embodiment, a media client 156 operating on a client device 154 may be responsible for processing a request to access the media object 110 by applying the media object processing rules 112. The media client 156 may be a proprietary application or may be a standard browser or application with a plug-in that operates in an intermediary fashion on behalf of an entity wishing to enforce the media object processing rules 112. As with the system 100, the system 140 may include a server 144 and a client device 154 coupled by a network 152, such as the Internet. In contrast to the system 100, the server 144 may omit the request processing and media object processing functions of the server 106 shown in FIG. 1 and may act primarily to serve media objects 110 and their corresponding media object processing rules 112 upon request in a conventional manner.

The storage medium 146 may be the same as or similar to the storage medium 108 of FIG. 1 and may be connected in one embodiment via a network connection 148. In other embodiments, the server 144 may be connected to the storage medium 146 via the network 152.

Returning to the client device 154, the media client 156 may include a request processing service 158 and a media object processing service 160. The request processing service 158 may determine if a particular media object 110 and/or its associated media object processing rules 112 are locally available. If not, the media client 156 may request these items from the server 144, either together or separately. For example, in an embodiment, the media object 110 may include a tag or marker that indicates that the media object 110 has associated media object processing rules 112. If the media client 156 has the media object 110 but does not have the media object processing rules 112 associated with the media object 110, the relevant media object processing rules 112 may be downloaded. The media client 156 may simply download the media object processing rules 112 from the same location from which the media object 110 was obtained or the media object 110 may include a reference identifier indicating a location from which the media object processing rules 112 can be retrieved. If the media object processing rules 112 are not available, the media client 156 may deny access to the media object 110 or may apply a default processing rule that substantially limits the usefulness of the media object 110.

In some cases, the media clients 104 (FIG. 1) or 154 (FIG. 2) may not be associated with a particular user, or any user at all, but rather may be services making a request for the media object 110 from another service.

The request processing service 158 may receive requests for access to a media object 110 either directly through a user interface or as requests are passed to it from another user interface. The request processing service 158 may also locally determine information such as, but not limited to, a location of the client device 154, an identity of a user of the client device 154, a number of times the media object 110 has been requested, and/or an age of the media object 110, in conjunction with the media object's 110 associated media object processing rules 112. When the conditions associated with the request have been qualified against the media object processing rules 112, the media object processing service 160 may be invoked.

The media object processing service 160 may then retrieve the media object 110, make alterations to the media object 110 as prescribed by its corresponding media object processing rules 112, and generate an altered media object 111. The altered media object 111 may be made available for presentation by the media client 156, either directly or at a downstream presentation service, such as a smartphone-based video player application. In one embodiment, the altered media object 111 may be stored and used as a basis for further alterations while serving subsequent access requests. In other embodiments, the altered media object 111 may be saved for later viewing or simply discarded.

Another client device 155 with a media client 157 may have a request processing service 159 and media object processing service 161 as discussed above, but may also include a rule assignment service 163. Similar to the rule assignment service 126 of the server 144 (FIG. 1), the rule assignment service 163 may provide a user interface that allows a user to specify conditions and alterations for media objects, such as media object 110. Because the rule assignment service 163 is intended for local use, it may be "lighter" than the server-based rule assignment service 126 which would likely operate on a much larger scale. That is, the rule assignment service 126 may be built for highly robust operation supporting complex threading, distributed processing, redundancy, and/or elegant error checking and recovery. In contrast, the rule assignment service 163 need only operate on only a single media object at a time and may, as with other very small footprint applications, provide only minimal error checking and recovery processing. In yet another embodiment, the server 144 may include the rule assignment service 126 that could operate in conjunction with, or instead of, the local rule assignment service 163.

Different versions of the media client, e.g., a media client akin to media client 156 without a request processing service 158 and media client 157 with a rule assignment service 163 allows, in an embodiment, the lower function media client 156 to be given away for free and the more capable media client 157 to be sold or offered as a premium incentive.

Figure 3:
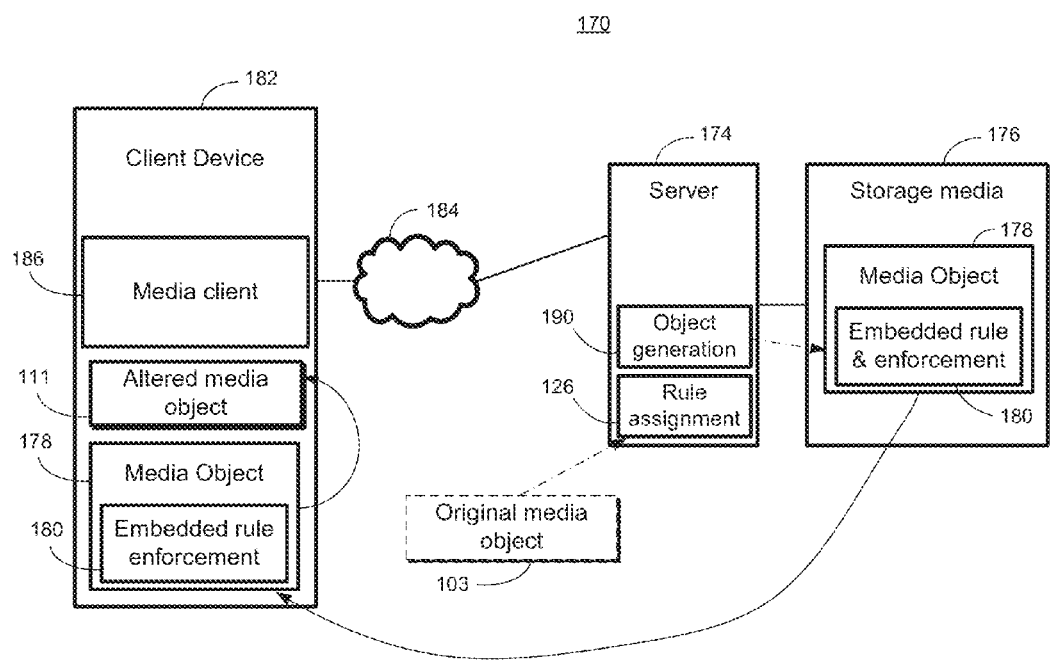
FIG. 3 is a block diagram of a system configured for contextual processing of electronic media objects, according to yet another embodiment.

FIG. 3 is a block diagram of another system 170 for contextual processing of electronic media objects 110, according to an alternative embodiment. The system 170 may include a server 174 that, as above, may be connected to a storage medium 176. The server 174 and storage medium 176 may be standalone entities or may be part of a distributed storage and processing environment (not depicted) that provides storage and processing services transparently to a user of the client device 182. The storage medium 176 may include an electronic media object 178 which incorporates embedded rules and enforcement code 180.

A client device 182 may be coupled to the server 174 by a network 184. The client device 182 may include a media client 186. The media client 186 may be a generic media presentation tool or service, such as the browser 120 illustrated in FIG. 1, or may be a specialized media client, similar to the media client 156 of FIG. 2.

In response to a request to access the media object 178, if the media object 178 is not currently accessible to the client device 182, the media object 178 may be transferred from the server 174 to either the client device 182 or to another external storage facility accessible by the client device 182. The media object 178 may evaluate conditions of the request or other data available that is associated with the request. Upon completion of the evaluation, the media object 178 may generate an altered media object 111 for presentation by the media client 186.

In an embodiment, the media object 178 or self-contained media object 178 may be a standalone module with both embedded rules and enforcement code 180 and raw media data. The embedded rules and enforcement code 180 may be executable code including, but not limited to, machine code, byte code, a compiled executable, or a scripted language source file. The executable code in the media object 178 may automatically execute after it is downloaded. Alternatively, selection of the media object 178 either via a user interface or as part of code executed by a browser or the media client 186 may cause the executable code in the media object 178 to execute.

The embedded rules and enforcement code 180 may evaluate conditions in accordance with the rules 112 and generate the altered media object 111. In an embodiment, the executable code may include communications modules that cause the media object 178 to communicate with a server, such as server 174, to determine values appropriate to a particular condition, such as how many times the media object 178 has been requested. In another embodiment, the server 174 may embed such variable information in the media object 178 as it is being delivered to the client device 182.

In an embodiment, the altered media object 111 may be presented as a known media type such as a JPEG image or MP3 audio file, so that the operations associated with generating the altered media object 111 are transparent to the media client 186. The altered media object 111 may be stored separately for later access or may be transitory and usable only for the current presentation. This may be a setting available while using the rule assignment service 126.

In addition to the rule assignment service 126 shown on server 174, an additional object generation service 190 may be available as well. The object generation service 190 may support additional processing in addition to generating the rules 112 associated with conditions and alterations discussed above. The object generation service 190 may generate a media object 178 that contains not only a representation of an original media object (e.g., original media object 103 of FIG. 1) but also contains an embedded rules and enforcement code 180 portion within the media object 178. Although not shown for clarity, the rule assignment service 126 and object generation service 190 may be supported together or separately on the client device 182.

The embedded rule and enforcement code 180 may operate as a self-extracting tool, e.g., wherein the media object 178 is an executable that runs when selected, gathers appropriate data related to the conditions for rule enforcement, and generates an altered media object 111 upon completion.

In one embodiment, rules that are more easily enforced, such as alterations based on a number of times the media object 178 has been accessed, may be a primary application of this technique. However, the self-contained model is also applicable to provide other alterations. Further, alterations performed within the media object 178 may also include communication with the server 174 or another distributed service (not depicted) to coordinate alterations made locally with a globally available criteria registry such as the number of times the media object 178 has been accessed on all platforms. That is, an alteration made locally based on the number of times the media object 178 has been accessed may use not the number of times a local copy of the media object 178 on the client device 182 has been accessed but rather base the alteration on the number of times all instances of the media object 178 have been accessed.

Figure 4:
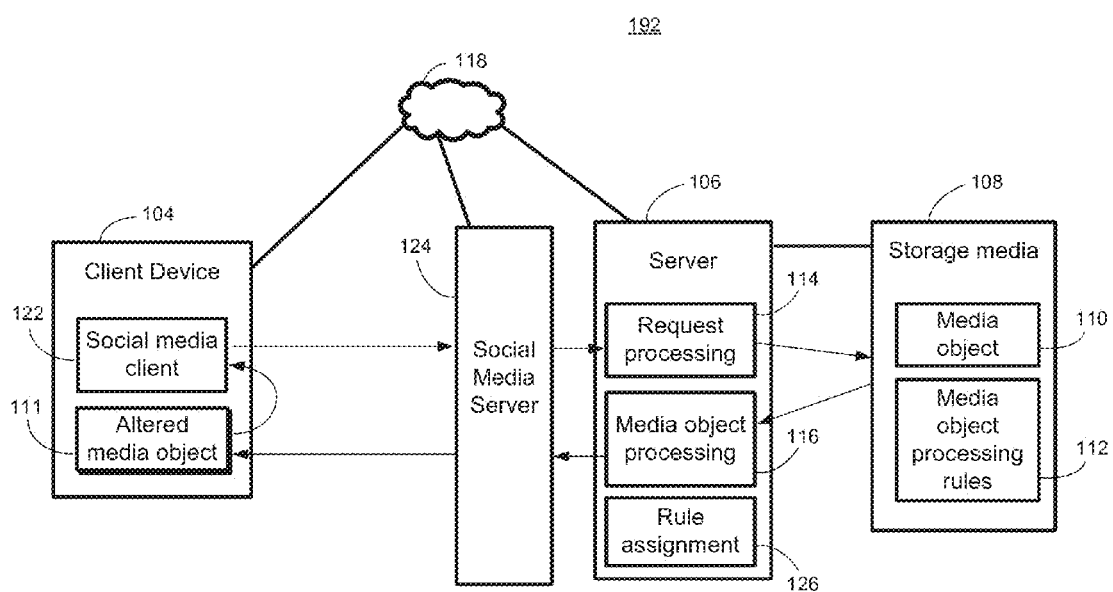
FIG. 4 is a block diagram of a system configured for contextual processing of electronic media objects, according to still another embodiment.

FIG. 4 shows a simplified block diagram of another system 192 for contextual processing of electronic media objects 110 according to yet another embodiment. In the illustrated embodiment, a social media client 122 operating on a client device 104 may provide a user interface for selection of a media object 110 and presentation of an altered media object 111. A social media server 124 may act as a front-end for the server 106 and storage medium 108 discussed above. However, in an embodiment, the social media server 124 may host one or more of the server-based services, such as the request processing service 114, the media object processing service 116, or the rule assignment service 126. For example, on a smartphone with a short message service (SMS) social media application, the social media server 124 may include a service that supports interactions with the server 106. When a user posts or re-posts a message to his or her social media feed, the social media server 124 may attach an altered media object 111, where, in the absence of the request processing 114 and media object processing 116, the original media object 110 would have been made available.

In an embodiment, the social media server 124 may also host the rule assignment service 126 to receive media objects 110 and rules 112 from the client device 104 or from another source, such as a client device 102 (not depicted in FIG. 4). In another embodiment, the social media server 124 merely passes rule creation and media object traffic to the server 106. If a user has specified predetermined rules for one or more classes of media objects, the social media server 124 may simply pass the identity of the user to the server 106 and the predetermined rules can be applied automatically to those media objects belonging to a particular class.

A variation may include the server 106 passing the media object back to the social media server 124 for storage and delivery. This variation may be particularly applicable to self-contained media objects such as media object 178 discussed above with respect to FIG. 3. In this embodiment, where the server 106 acts as a processing service to the social media server 124, the server 106 may act on behalf of multiple social media servers 124 so that a user may establish one or more standard processing sets and direct each social media service for which the user has accounts to use the service provided at server 106 for serving all media objects from the user. Thus, for example, a user's friend-oriented, short message service-oriented, photograph-oriented, or video-oriented social media outlets may all use the same rule assignment and media object processing services from server 106.

Figure 5:
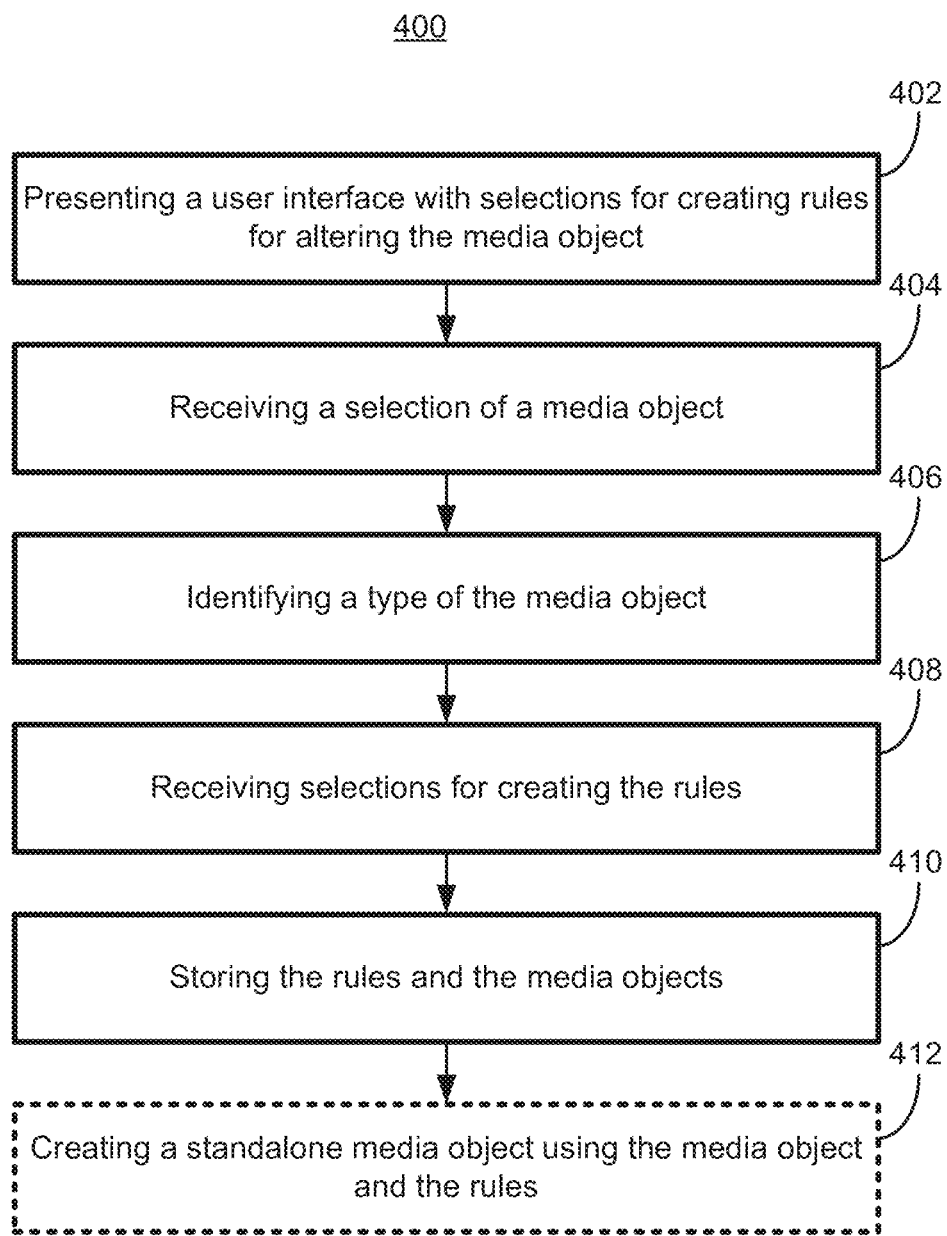
FIG. 5 is a flow chart illustrating a method of associating rules with an electronic media object, according to one embodiment.

FIG. 5 is a flow chart illustrating a process 400 associating rules with a media object 110, according to one embodiment. At stage 402, a media classification service, such as a rule assignment service 126, may present a user interface for selecting a media object 110 and creating associated rules for altering the media object 110, when the appropriate conditions are met, as part of serving a request for access to the media object. The user interface may be presented when the media object is created or otherwise obtained. For example, when capturing a photograph using a mobile computing device (e.g., a tablet or smartphone), the user interface may automatically appear and allow creation of access and distribution rules. Alternatively, a menu of predetermined rule sets may be established and selected by a designator when the media object is created or obtained. In yet another embodiment, heuristics may be used to observe characteristics of rule creation with respect to the types and/or content of the media objects 110 for which rules are being created. The heuristics may allow automatic assignment of rules to media objects based on their content and/or type or may allow automatic creation of menu selections for manually assigning rules to media objects.

For example, a user may consistently assign face blurring rules to photographic images with faces in them. After a learning period, the rule assignment service 126 may automatically begin assigning face blurring rules to all photographic images with faces. Alternatively, the rule assignment service 126 may ask the user if such an automatic assignment should be enabled, or simply ask the user each time if such an assignment should be made as the photographs are captured.

Such heuristics may capture common elements of images that are assigned a common set of rules (e.g., common elements such as geographic location) either in real time or when post processing images, and may begin to automatically assign rules to other image media objects 110 having those same elements.

Similarly, other types of media objects 110 may be automatically classified. For example, audio files with a common name element, such as a person's or artist's name, may all be assigned a common set of rules.

At stage 404, a user selection of a media object 110 may be received via the user interface. The selection may be made explicitly with, for example, a user dialog box, or may be made implicitly, for example, in association with capturing a photograph via a cell phone camera. At stage 406, the type of media object 110 may be identified so that appropriate rule selections may be presented. For example, when an image media object is identified, bitrate alterations do not apply and either may not be presented or may be disabled.

At stage 408, user selections for creating rules may be received. In one embodiment, the selections may be associated with aspects discussed above, such as, but not limited to, geographic location of the media object 110, age of the media object 110, or a number of times access to the media object 110 is requested. In addition, the types of alterations to be made to the media object 110 may be defined. As discussed above for various media object types, the alterations may include, but are not required to include and are not limited to, changes in resolution, length, color theme, or bitrate.

The media object 110 may include items such as photographs, music, videos, or illustrations, such as CAPTCHA (Completely Automated Public Turing test to tell Computers and Humans Apart) renderings. As the media object 110 is stored, associated media object processing rules 112 corresponding to alterations to be applied to the media object 110 may also be generated and stored in association with the media object 110. In various embodiments, the media object processing rules 112 may be part of the media object 110 itself, may be identified by a one or two way reference in the media object 110, or may be associated with the media object 110 via a lookup or database table.

The media object processing rules 112 may include or exist in two parts: conditions and alterations. The conditions may fall into either of two general categories. A first category may include conditions which are related to properties of the media object 110 itself. For example, a condition may specify alterations based on an age of the media object 110. In an example embodiment, for each month the media object 110 ages, its quality is reduced by 10% (e.g., via a reduction in pixel density for a photograph or a reduction in bitrate for music).

In another embodiment, a photograph may be artificially aged at 5% per year by adding lines that look like wrinkles and/or iteratively reducing the height and width of the photograph so that after a period such as 20 years, the photograph is essentially unrecognizable. In another embodiment, in order to address digital legacy issues, a photograph may be available at full resolution for a period of years after which it degrades quickly to become unrecognizable.

As another example of a condition that is related to properties or characteristics of the media object 110 itself, the number of times the media object 110 has been accessed may be one criterion characteristic as discussed above. To illustrate, a photographer, filmmaker, or musician may wish to reward those who follow his or her work more closely by allowing the first people to access a new work to receive a full resolution copy, and as successive accesses are made, the resolution of the media object 110 is progressively or suddenly reduced.

A second category of conditions may be based on a characteristic of the request for the media object 110 rather than on a characteristic of the media object 110 itself. As opposed to responsive themes used to build websites that adapt to the screen size or the brand of browser from which a request is received, request-based conditions may be associated with characteristics of the entity requesting the media object 110 (not the device type or browser type). The simplest of the request-based conditions is an identity of the entity requesting the media object 110, and may require a login sequence or presentation of a cookie or token.

Another condition based on the request for the media object 110 may use an Internet Protocol (IP) address from which the request was received. For example, if a content owner has many relatives in a particular part of a country, a condition may be set to provide full resolution copies of the media object 110 when the request comes from a range of IP addresses that fall within a range associated with that part of the country. As discussed further below, the content owner may simply specify a geographic area, either using a map or by specifying a city, area code, zip code, county, or other regional identifier, and the rule assignment service 126 may create a range of IP addresses that would cover the specified area. Requests from IP addresses outside of that range of IP addresses may a trigger one or more reductions in resolution of the media object 110. Unlike a firewall, that simply allows or denies access to media objects 110 based on IP address, the media object processing service 116 may provide an altered media object 111 even when the IP address criteria fails.

Alternatively, because IP addresses are not always geography oriented and are susceptible to spoofing, the IP cost of a request (e.g., a number of hops between a server 106 and the client device 104) may be used as a processing criterion. Because the location of the server 106 may not be known, a user may specify the IP cost or number of hops between an originator client device 102 and the requestor client device 104. For example, if four hops are specified, the client device 104 must be accessible by the client device 102 within four hops or else the condition fails.

Similarly, a condition may be set up for an exact geographic region so that requests from a certain city receive a full resolution media object 110 and others receive an altered media object 111 having reduced resolution. This list of conditions is not intended to be comprehensive and other conditions that may be used either based on the media object 110 itself or the request are contemplated.

The second part of the media object processing rules 112 are the alterations that are applied as a consequence of meeting or not meeting one or more of the conditions discussed above. As with the condition portion of the media object processing rules 112, the alterations portion of the media object processing rules 112 may take any of a variety of forms. By way of example, these alterations may include changing a quality of the media object 110, such as image quality, video quality, or audio quality by various mechanisms, several of which have been discussed above. While in many embodiments changing the quality of the media object 110 may entail reducing the quality, in other embodiments, a default presentation of the media object 110 may be a reduced resolution version, and meeting one or more of the conditions may cause the resolution to be increased to an original full fidelity or other improved form. In other embodiments, the alteration may include processing the media object 110 by blurring one or more human faces in the media object 110 or by processing the media object 110 with a color-adjusted theme, such as applying a sepia tone or black-and-white effect. In another embodiment already discussed above, the alteration may include processing the media object 110 with one or more artificial aging characteristics associated with an aged physical media.

While for simplicity the discussion herein is focused on the application of one condition with one alteration, more complex processing is possible using combinations of conditions and/or combinations of alterations.

Continuing with FIG. 5, at stage 410 of the process 400, the rules and media objects 110 may be stored. In various system architectures, the rules and media objects may be stored together, for example, in the same database or file system or may be stored completely separately in different locations and/or different databases or file systems.

Optionally, at stage 412, the media object and rules may be processed into a standalone, self-extracting object, as described above with respect to FIG. 3.

Figure 6:
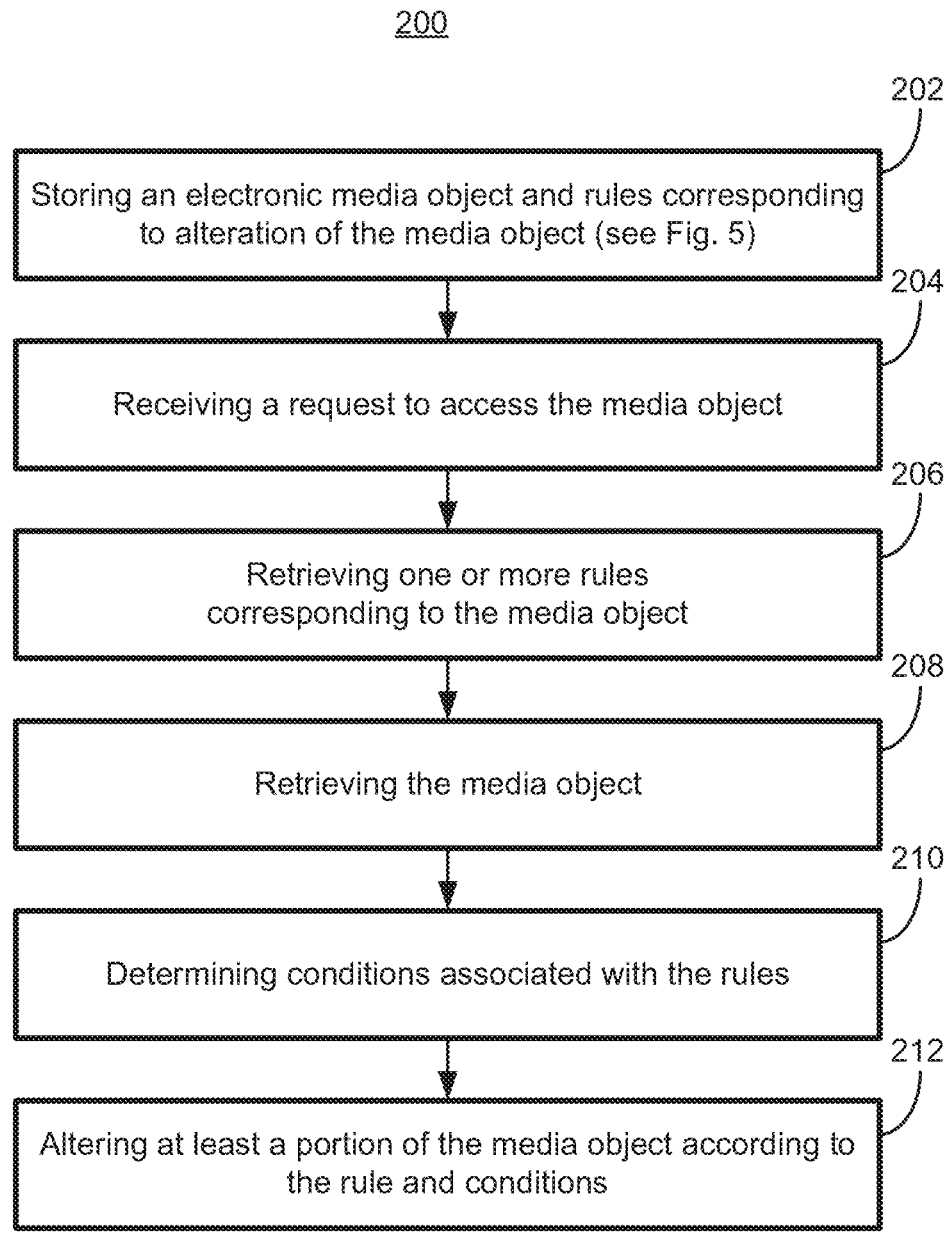
FIG. 6 is a flow chart illustrating a method of processing electronic media objects based on a context of the retrieval, according to one embodiment.

FIG. 6 is a flow chart illustrating a method 200 of processing a media object 110 based on a context of the retrieval, according to one embodiment. The steps of the method 200 may be performed in a different order than illustrated or at least partly in parallel rather than serially except to the extent such performance would be inoperative with the disclosed example. At stage 202, an electronic media object 110 and associated media object processing rules 112, discussed above with respect to FIG. 5, may be stored in a storage medium 108 such as a server memory or a distributed storage service.

At stage 204, a request to access the media object 110 may be received. The request may include explicit information such as an identity of a requesting entity or may include information used to implicitly develop information about the request such as an IP address. The identity of the requesting entity may be the result of a specific login process, or the identity may be included as a reference from a referring source, such as a social media application. For example, in an embodiment, a request for the media object 110 from a known social media account may be served with a full resolution copy of the media object 110 while a request referred via a search engine may only receive a reduced resolution copy of the media object 110.

At stage 206, one or more media object processing rules 112 corresponding to the media object 110 may be retrieved from the storage medium 108. At stage 208, the media object 110 itself may also be retrieved from the storage medium 108 or elsewhere.

At stage 210, the condition portion of the media object processing rules 112 may be evaluated against the appropriate criteria, such as an IP address associated with the request or a number of times the media object 110 has been accessed. Other condition criteria, discussed above, may also be determined, such as an identity associated with the media object 110, a location associated with the request for the media object 110, the number of times the media object 110 has been requested, or the age of the media object 110. In an embodiment, the number of times accessed or the age of the media object 110 may be included in metadata stored with the media object 110 or may be stored as regular data in a database (not depicted) operating on or accessible by the server 106.

At stage 212, the media object 110, or some portion thereof, may be altered according to the appropriate alteration portion of the media object processing rules 112 to generate an altered media object 111. The alterations may be dependent on the type of media object 110, and be made from a common base version or from a device specific version of the media object 110.

Figure 7:
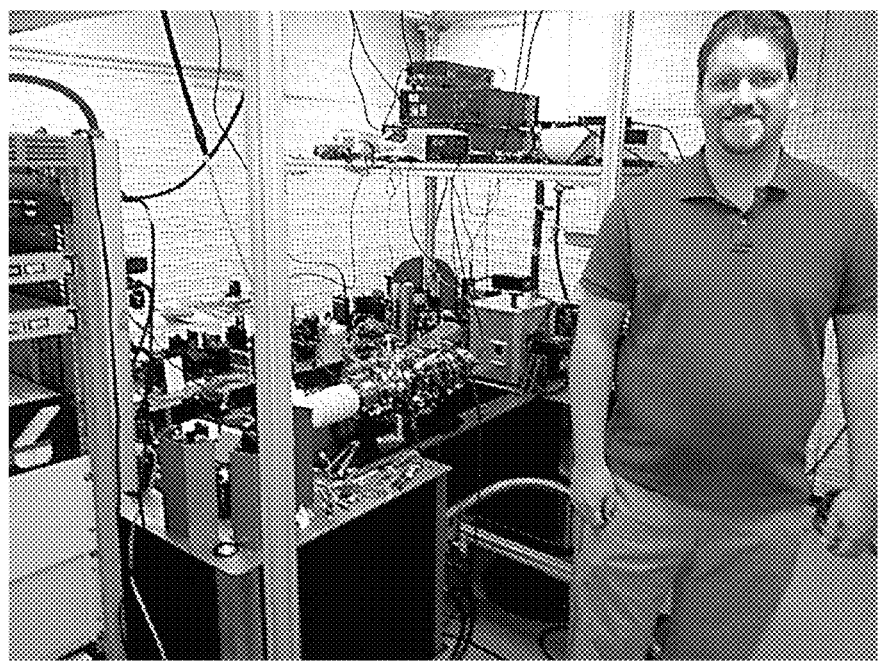
FIG. 7 is an original image prior to application of context-specific processing.

Referring to FIGS. 7-12, these figures illustrate example image media objects 110 (simulated photographs) as well as examples of classes of alterations that may be made to such image media objects 110 in accordance with various embodiments of the disclosed principles. FIG. 7 represents an original media object 110 at full resolution with original coloration, which in the illustrated example is grayscale coloration.

As noted above, the creator of such an image media object may associate one or more usage or aging rules with the media object 110 to govern the degradation of the media object 110 experienced by the consumer or consumers of the image media object 110 over time, extent of use, or other usage parameter. For example, the user may desire to limit the number of times that the image media object 110 may be viewed in total, the number of times that each of one or more users may view the media object 110, or the type or location of viewers that may view the media object 110 in full detail.

As to the latter, for example, the creating user may deem the image media object 110 to be viewable in full detail by consumers located in one country and viewable in lesser detail as to one or more aspects of the image subject matter by consumers located outside of that county or in certain specified areas. More generally, in keeping with the rules established by the creating user and thereafter permanently associated with the image media object 110, the consumer experience connected to the media object 110 may vary by user, by geography, or by time or order of access.

Figure 8:
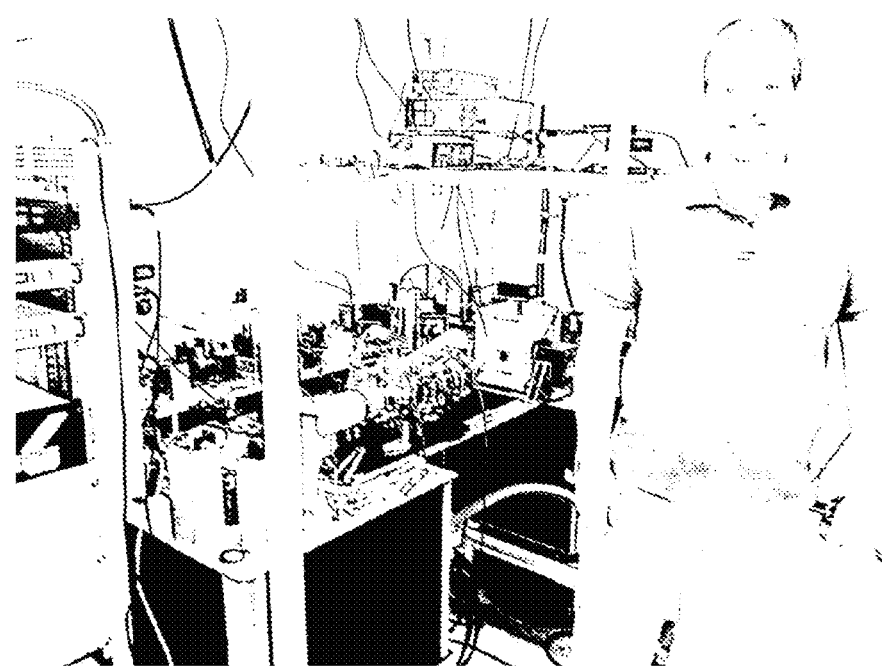
FIG. 8 depicts a modified image resulting from applying a resolution reduction algorithm to the image of FIG. 7.
Figure 9:
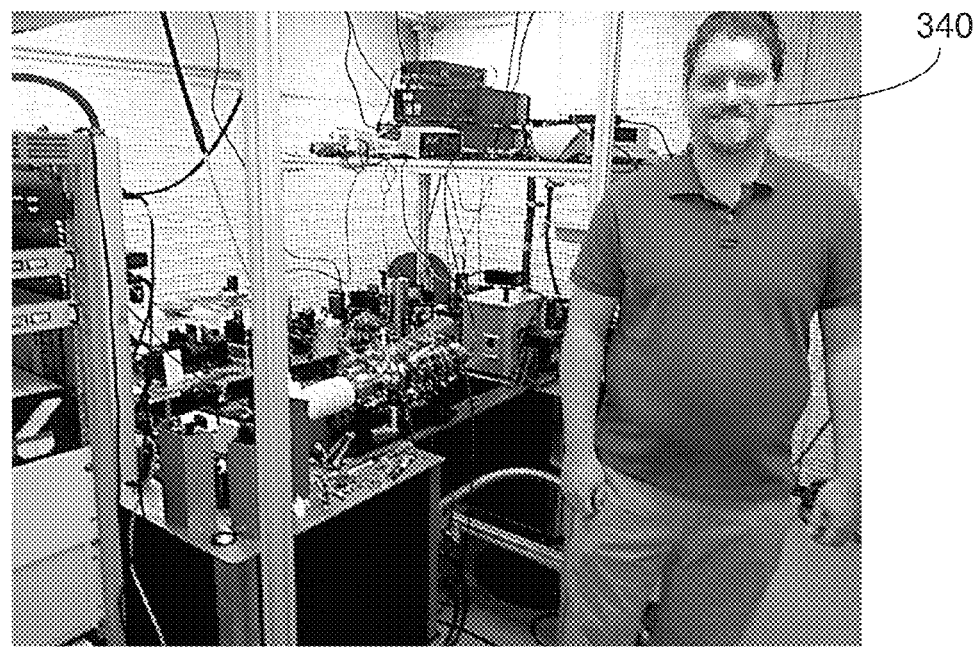
FIG. 9 depicts a modified image resulting from applying a face detection and alteration algorithm to the image of FIG. 7.

Turning to FIG. 8, this figure shows an example of applying a resolution reduction algorithm to the media object 110 of FIG. 7. The filter in the illustrated example yields a uniform reduction in fidelity across the entire media object 110. In this illustration, the filter applies a binary thresholding criterion such that the color depth of the image is reduced so that only the darkest areas of the original image remain. Other changes similar to this are possible including inverting the black and white to create a negative image. This type of transformation may be applied gradually (e.g., by applying it gradually to a greater number of pixels or by applying a gradually changing threshold) in a case where gradual degradation is desired. This could be desired, for example, to impose an aging or usage limit on an image media object 110. Alternatively, this filter could be applied at full strength immediately (e.g., in the case of a geographical restriction on viewing).

As noted above, it sometimes is useful to specifically degrade or otherwise modify only selected portions of an image (e.g., a license plate, address, or face). In the illustrated example of FIG. 9, the media object 110 of FIG. 7 has been processed via a face detection and alteration algorithm applied only to the pixels in the region of the subject's face 340. The amount of reduction in fidelity and/or face blurring may be set using the rule assignment service 126. With respect to allowing an image creator or provider to establish a rule pertaining to blurring or otherwise filtering a facial region, the system may allow the user to outline each facial region of interest, and thus define the pixels to be modified. Alternatively, available processes for facial recognition may be used to identify the presence of one or more faces in an image, without necessarily identifying the persons associated with the faces. Alternatively, full facial recognition software, such as "GaussianFace" developed at the University of Hong Kong or the FaceSDK from Luxand, Inc., of Alexandria, VA, may be used to identify faces in an image to the creator or provider to facilitate the establishment of rules on blurring and aging.

Additional controls available via the rules may allow selected faces to be obscured while others remain at full fidelity. Moreover, entirely different facial image manipulation techniques may find beneficial application here as well. For example, a facial image may be altered, without any blurring at all, so that the subject appears much older or younger than the subject's actual chronological age. The aging or de-aging of one or more faces in an image media object 110 in this way may be used to gradually modify the image media object 110 to cause a loss of fidelity without the loss of fidelity being apparent to a user that is previously unfamiliar with the image, unlike blurring or other techniques that rely on visual distortion.

Similarly, it is possible to morph one facial image into another facial image gradually, such that the ending image shows an individual that need not look like the subject in the starting image. The second image may be any suitable subject (e.g., from a public domain photograph or other common source). Again, to a user that has not previously seen the image, this loss of fidelity will not be apparent. Such techniques will discourage unauthorized consumers of aged images from trying to "see through" the aging like they might with blurring or other distortion-based techniques. Indeed, digitally distorted images can be digitally reversed to identify previously unknown individuals. In light of this possibility, "lossy" (e.g., irreversible) rather than lossless modifications may be preferred depending upon the value of the image or information in question to help ensure the privacy of people that appear in photos.

The creating user may be given a choice of other modifications to be applied to the image media object 110 as a function of access number, chronological age, consumer location, and so on. For example, the creator may desire to erode the image piece by piece rather than to distort or modify the data in place. This may be seen as preventing any reconstruction of data from distorted or altered data, since it is very difficult to reconstruct data that is simply missing.

Figure 10:
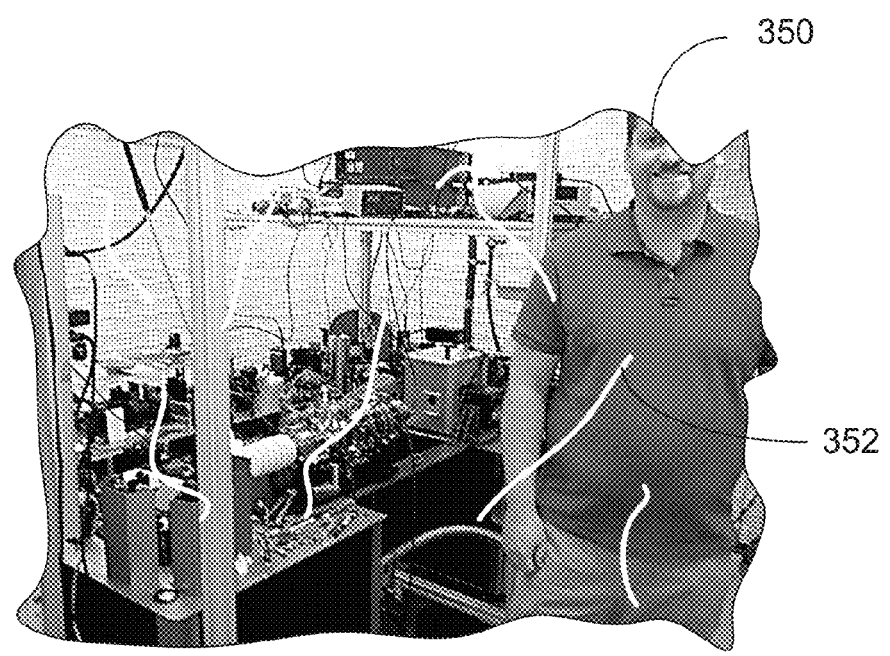
FIG. 10 depicts a modified image resulting from applying an aging algorithm to the image of FIG. 7.

To this end, FIG. 10 illustrates the application of an erosive artificial aging algorithm to the media object 110, wherein portions of the image data are simply destroyed. In the illustrated example, these parts include edge portions 350 as well as internal canals or wrinkles 352. The locations of the removed material may be randomly selected or may be selected based on the known locations of important features (e.g., faces, letters, numbers, or other data-carrying imagery). Similarly, the amount of destruction executed in each step may progress linearly, exponentially, according to a step function, or in any other creator-desired manner.

For example, if the original image of FIG. 7 is set to age at 10% per month, with a 6-month termination, then towards the end of six months, almost 60% of the original image will be obscured; however, when the image reaches exactly six months of age, the entire image will be gone. Alternatively, the creator may set a rule specifying that no more than a set amount of the image will be obscured (e.g., 80%). This may aid in reacquiring lapsed licensees who need to recognize the image to some extent in order to be convinced to renew their license.

Figure 11:
FIG. 11 depicts a modified image resulting from applying a resolution reduction algorithm to a portion of the image of FIG. 7.

As noted above, the creator may establish a rule treating different portions of the image differently. With respect to FIG. 10, the disclosure considered various filters and processes that are applicable to facial images to modify them in keeping with aging or distorting an image. With respect now to FIG. 11, this figure shows another aspect of altering a specific-area, but with respect to a non-facial portion of the image. In particular, FIG. 11 illustrates the media object 110 of FIG. 7 with a full resolution portion 360 and a reduced resolution or reduced fidelity portion 362.

In this case, the reduced fidelity portion 362 of the image is a rectangular region that contains only equipment and objects but no human subject to which actual alteration processing could be applied. In the illustrated example, a binary thresholding has been applied in the selected location, rendering the grayscale image in the area black and white. Again, the selection of a region and the amount of reduction of fidelity may be set during development of the media object processing rules 112 for the media object 110 (e.g., if the creator desires to affect only certain portions of the image, or may be automatically or randomly selected initially or at each iteration).

In this embodiment, with each iteration, the filtered portion of the image may grow and spread, move and spread, propagate or multiply, or otherwise progressively cover a larger and larger area of the image. The creator may desire this type of binary alteration in a situation where it is permissible for large portions of the image to become unrecognizable without destroying the entire value of the image to the creator (e.g., such that the creator may still generate further sales, licenses, and uses).

Although the image alteration filters and techniques described with respect to FIGS. 8-11 will generally render the image of the image media object 110 or portions thereof largely undecipherable, it is possible to modify the image in a way that simply renders it less valuable. This is especially useful to the creator when the value of the image is in the beauty or artistry of the image and does not lie within any particular data or information held by the image. For example, a color photograph of a beautiful sunset will degrade in value if it is rendered in black and white, even though it remains entirely recognizable. Alternatively, a photograph of a royal couple out on the town for the first time after their baby is born will sell just about as well in black and white as in color, since the value of the image is not based in aesthetics but in novelty.

Figure 12:
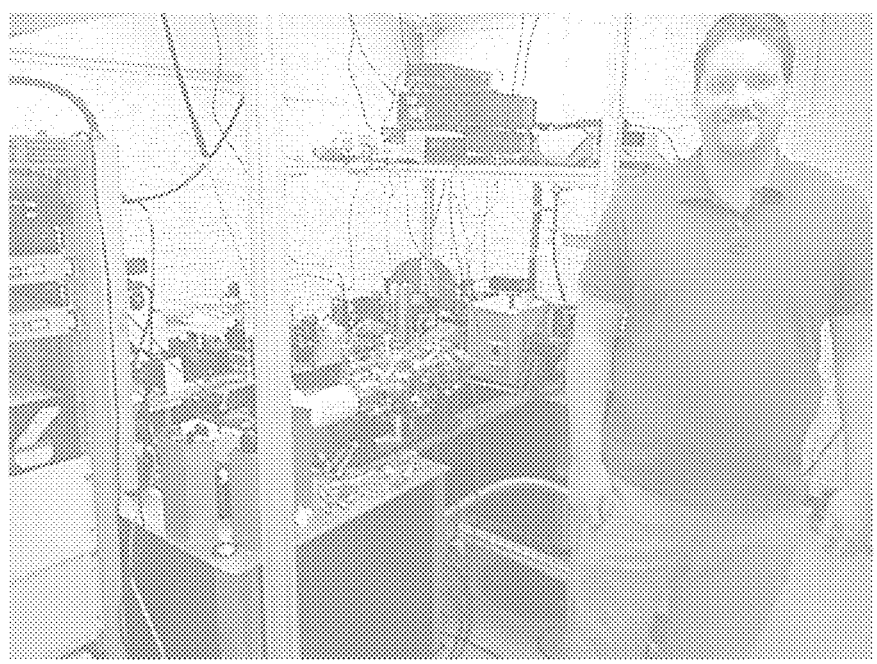
FIG. 12 depicts a modified image resulting from applying a color scheme alteration algorithm to the image of FIG. 7.

In this connection, FIG. 12 illustrates the application of a color-adjustment modification to the media object 110 of FIG. 7. In the illustrated example, a grayscale effect has been applied uniformly to the entirety of the original image of FIG. 7. However, it will be appreciated that the affect may be applied selectively or randomly to only parts of the image, further decreasing the image's aesthetic appeal, with the degree of fragmentation increasing as the image ages chronologically or with respect to the number of accesses. Although the given example applies a grayscale transformation, it will be appreciated that other color modification effects or filters may additionally or alternatively be applied (e.g., color inversion, color negative, sepia toning, color shifting, contrast change, as well as other changes related to the manner in which colors are calculated or presented).

The use of artistic effects, such as artificial aging or color-adjusted themes may help to reach a desired level of obfuscation of an image, for example to protect personal information or as part of an incentive, but without the offense or heavy-handedness of blurring or changes in resolution. The image media object 110 may be altered along other dimensions as well, including, but not limited to, color depth, pixel size, image size, or other special optical effects applied to the entire image or a portion of the image (e.g., swirls). In altering color depth, the number of bits of color data for each pixel may be reduced to produce fewer color choices, that is, a coarser color granularity, for each pixel.

Returning to FIG. 6, alterations to other types of media objects 110 will be described. Alterations to an audio media object 110 may include editing for length, reducing bitrate, or adding static to the content. If edited for presentation length, the rule may specify both the amount of the audio media object 110 to redact either by time or by percentage and may specify where to begin (e.g., from the beginning going forward, from the end going backwards or from a specified point in the audio content).

In the event that the audio media object 110 is to be edited for bitrate (or sampling rate) for example, a sigma-delta converter algorithm that restores digitized audio may use, instead of a commonly used bitrate of 192 kilobits/second, a reduced sampling rate of 32 kilobits/second, which is generally only acceptable for speech. Higher or lower final bitrates can be specified to achieve different desired effects.

Static noise may be added to an audio media object 110 or video media object 110. For example, white noise can be algorithmically added to an existing audio file. For example, a simple mathematical algorithm may generate random numbers within a given dynamic range of the media object 110, which can be added to or subtracted from individual digital media sample values to create variations from the originally stored media object 110. When played, the incorrect values cause distortions relative to the full fidelity media object 110. Similarly, aging effects, including static, may be added to an audio media object 110. Instead of using random numbers, maximum level values can be substituted for a range of samples to create a click or pop. In other cases, minimum level values may be substituted for a range of samples to create a skip. These clicks, pops, and/or skips can be processed into an audio file using digital signal processing algorithms or other suitable techniques. Echo, pitch change, "flanging," and phase change are other commonly used digital signal processing algorithms that may be used to alter an audio media object 110. When processing a video media object 110 that is encoded with MP4 (Moving Picture Experts Group layer 4), an algorithm may analyze the encoded data and remove additional high frequency information (that is, further compress the data) or may simply remove data from P frames from within a sequence to reduce the clarity of the video when recovered and played back.

Akin to the alteration of audio media content, a video media object 110 may also be altered in length or altering how much of the video media object 110 is presented. That is, a video processing rule may specify both the amount of the video media object 110 to redact and the location of that redaction by playtime of file location. In another embodiment, a color video media object 110 may be converted to black and white for presentation.

Altering a video media object 110 as opposed to a purely audio media object, offers numerous additional modification options. For example, alteration of the video component of such an object may include altering sampling rate, pixel size, color (or bit) depth, or frame rate.

When used with CAPTCHA images, the media object processing rules 112 may be used to evaluate the likelihood of the access being associated with a friendly user or a hostile user, including some of the same criteria discussed above, such as actual location or a location implied by IP address, referral information, a number of times accessed (volume), or a rate at which access is occurring (velocity). According to the criteria specified in the rules, the presented CAPTCHA image may be obscured to a greater or lesser extent. That is, a more suspicious request for access may lead to a more highly modified image while a less suspicious request for access may lead to a less modified image.

The altered media object 111 may then be viewed, played, or otherwise used based on the actual content of the altered media object 111. As discussed above, with respect to FIG. 1, the altered media object 111 may be in every respect compliant with the expected format of a particular data type, including, but not limited to, JPEG (Joint Photographic Experts Group), GIF (graphics interchange format), PNG (portable network graphics), BMP (bitmap), PDF (printer definition file), MP3 (Moving Picture Experts Group layer 3 audio), MP4, 3GP (Third Generation Partnership Project), AVI (audio video interleave), MPEG (Moving Picture Experts Group), Quicktime (or MOV), SWF (Shockwave Flash), and WMV (Windows media video). The media object 110 may be processed and presented using a browser, a plug-in, or an application.

Another embodiment may produce an altered media object 111 that can be presented only by a custom application or plug-in to further enhance security. In other embodiments, steganographic information in an image or other media object 110 may be used as a basis for rule application or as a way to store request-related historical data or age information.

In some embodiments, the altered media object 111 may be stored and used as the basis state for further alterations associated with subsequent requests to access the media object 110. For example, in one embodiment, referring to FIG. 1, after creating an altered media object 111, the media object processing service 116 may store a copy of the altered media object 111 back on the storage medium 108, alongside media object 110 or instead of (replacing) media object 110. When a subsequent request for the media object 110 arrives at the server 106, depending on what rule is active, the media object processing service 116 may retrieve the altered media object 111 and use that as a basis for a next progressive alteration to the already altered media object 111.

For example, an image media object 110 may have a rule that specifies a 1% reduction in resolution (e.g. pixel density) for each subsequent request to access the image media object 110 after the first request. Upon the first request, the media object processing service 116 may pass the image media object 110 to the client device 104 unaltered. The second access may cause the media object processing service 116 to reduce the resolution of the image media object 110 to 99% creating a first iteration copy of the image media object 110. The first iteration copy may then be stored on the storage medium 108. Upon the next request to access the image media object 110, the media object processing service 116 may retrieve the first iteration copy and reduce its resolution by an additional 1% (e.g., as a percentage of the original resolution), creating a 98% resolution second iteration copy. This process may be continued until a terminal resolution is reached, such as 20% or some other value. Alternatively, the media object processing service 116 may retrieve the full resolution media object 110 and apply the desired level of resolution reduction.

Figure 14:
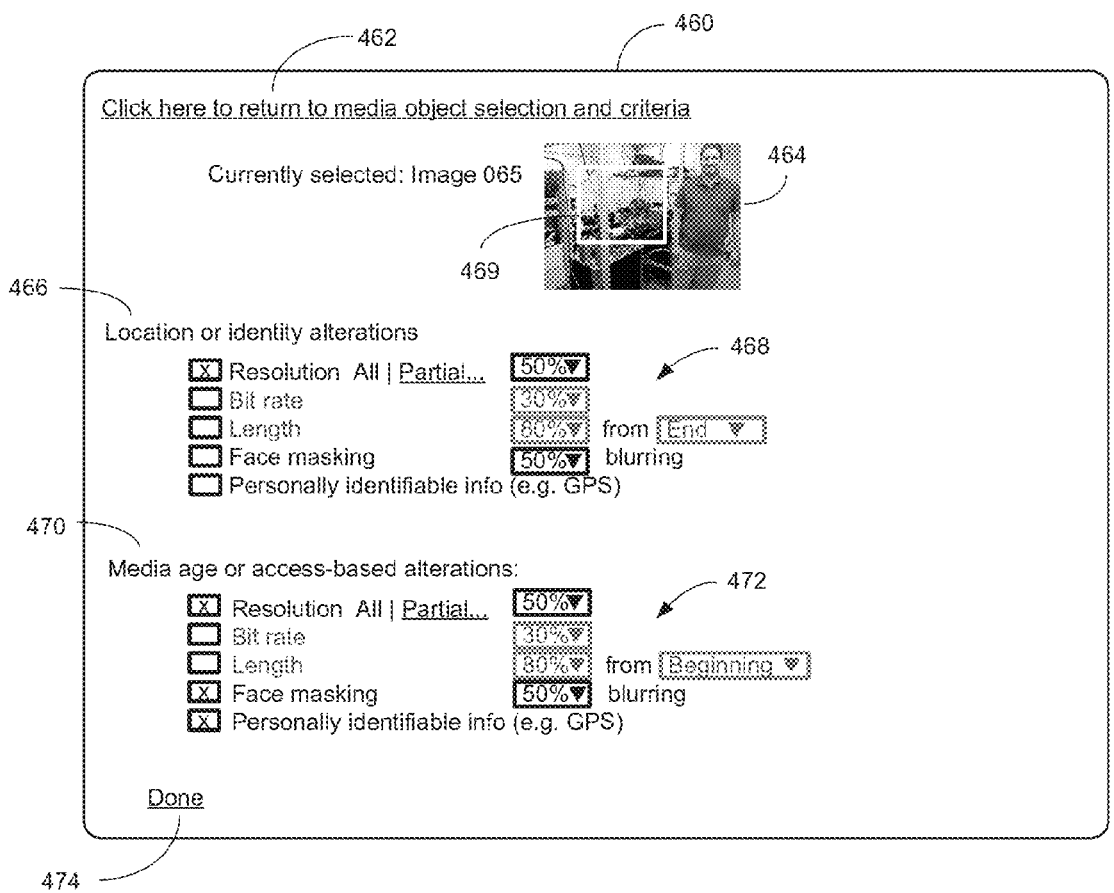
FIG. 14 depicts an aspect of a user interface for associating rules with the media object, according to another embodiment.

Referring to FIGS. 13 and 14, one embodiment of the user interface discussed above is depicted. The embodiment of FIGS. 13 and 14 may be presented in any one of numerous formats. For example, the illustrated interface may be optimized for a portrait format mobile device screen or combined into one screen for a desktop application. The options presented in FIGS. 13 and 14 are for illustration of general concepts and are not exhaustive.

FIG. 13 depicts one screen of an embodiment of a user interface 430. The user interface 430 may include a hot link 432 that activates a dialog box (not depicted) allowing selection of an original media object 103 in a known manner. In the illustrated embodiment, the image of FIG. 7 is shown selected via a thumbnail image 434. Other media types may show a generic icon, for example, a music note for an audio file, or a file name. Selection boxes 436, 438, 440, and 446 illustrate various criteria that can be tested to determine if one or more rules should be applied.

A "location" selection box 436 has accompanying information that allows a user to specify a geographic location or region. The user may also specify how the determination of location should be made, that is, by selecting a radio button indicating that available user data or an IP address should be used, as discussed above. Additional criteria such as a distance or radius from the selected location of either the user or a location where the image was taken may be included in other embodiments.

An "identity of the requestor" selection box 438 allows a user to specify an identity of a requester (person or entity) for whom a rule applies. As illustrated, radio buttons may allow the user to select presentation of a login or to use some other identity, such as a social media identity available as a reference in a request. Alternatively, a user may specify a maximum degree of separation on a social media graph to be allowed access to a full fidelity media object 110. For example, with a degree of separation set at one, if a "friend" requests access to an image, he or she may be given a full resolution version of the image. However, if a "friend of the friend" with a social media graph distance of two requests the image, he or she may get an altered image according to the rules specified for that image.

An "age of the media object" selection box 440 may allow a user to select an extent, degree, or other amount by which to degrade a media object 110 per time period. In this example, a drop down box 442 allows selection of a percentage amount and another drop down box 444 allows selection of a time period. The time period may range from seconds to years, depending on an expected rate of requests and the user's desired rate of change. The definition of time period may also be a user-definable characteristic (e.g., time since creation, time since upload, or time since first retrieval). Specific choices as to how to degrade the media object 110 are discussed with respect to FIG. 14. In another embodiment, the user interface 430 element allows selection of a terminal level of degradation; for example, the poster may specify that a media object 110 will not degrade beyond 85%.

A "number of accesses of the media object" selection box 446 may allow a user to specify that a certain level of degradation of the media object 110 should occur for each access (or increment of accesses) to the media object 110. As illustrated, a drop down box 448 allows selection of a percentage to degrade the media object 110 and another drop down box 450 allows the user to specify the occurrence rate. For example, in high volume situations, the user may want to allow the media object 110 to degrade over a higher number of accesses than simply one increment per access. To specifically illustrate, if a popular music group releases a music video media object to the public on a first come, best served basis, the increment for degrading the media object may be 0.5% and the volume unit may be 100,000, allowing as many as 1 million parties or more to get a reasonable quality copy of the music video. Additional mechanisms may be implemented if desired to prevent early downloaders from selling or publicly posting their copy of the music video.

In various embodiments, more than one selection box may be selected for a single media object or group of media objects so that combinations of criteria may be specified. A continue button 452 may allow the user to progress to the screen illustrated in FIG. 14.

FIG. 14 depicts another screen 460 of the user interface also depicted in FIG. 13. A return button 462 may allow a user to return to the user interface 430 of FIG. 13. An icon 464 of the currently selected media object may be shown. A group 466 of selection boxes associated with location and/or identity may allow a user to select one or more mechanisms 468 to degrade the media object. Certain selections may be "grayed out" indicating they do not apply to the current media object type. In an embodiment, when a "Resolution" selection is made, as depicted, a user may be able to select between "All" and "Partial" with respect to areas of the image to selectively alter. If "Partial" is selected, an additional pop-up or menu (not depicted) may be enabled that allows the user to specify the area of the image to alter. In one embodiment, a rectangle 469 may be displayed that can be located and sized to achieve the desired selection area. In another embodiment, a freehand tool may be selected rather than a geometric shape so that a user can draw an irregular figure for use in defining the area to alter.

Another group 470 of selection boxes allows media object age or access-based alterations to be specified by selection of one or more mechanisms 472. As above, certain selection boxes may be "grayed out" indicating they are not appropriate for the type of media object. Referring specifically to the "Personally identifiable info" selection option, the activation of this rule may remove one or more things about the media object that could identify someone, for example, subjects in the media object or an original owner of the media object. This information may include, but is not limited to, location information (e.g., associated with a photograph), license plate or address information in the media object, a date and time associated with creation or editing of the media object, faces in the media object, and other metadata (e.g., specifying a type of equipment used to create the media object).

The illustrated embodiment combines location and identity and combines media age and access-based alterations, since these criteria may be more likely to be applied in a mutually exclusive manner. Other embodiments may present each element separately. More options for altering media objects are possible as discussed above, and the illustration of FIGS. 13 and 14 are not intended to limit those choices or the other possible ways in which rules are selected and applied.

Figure 15:
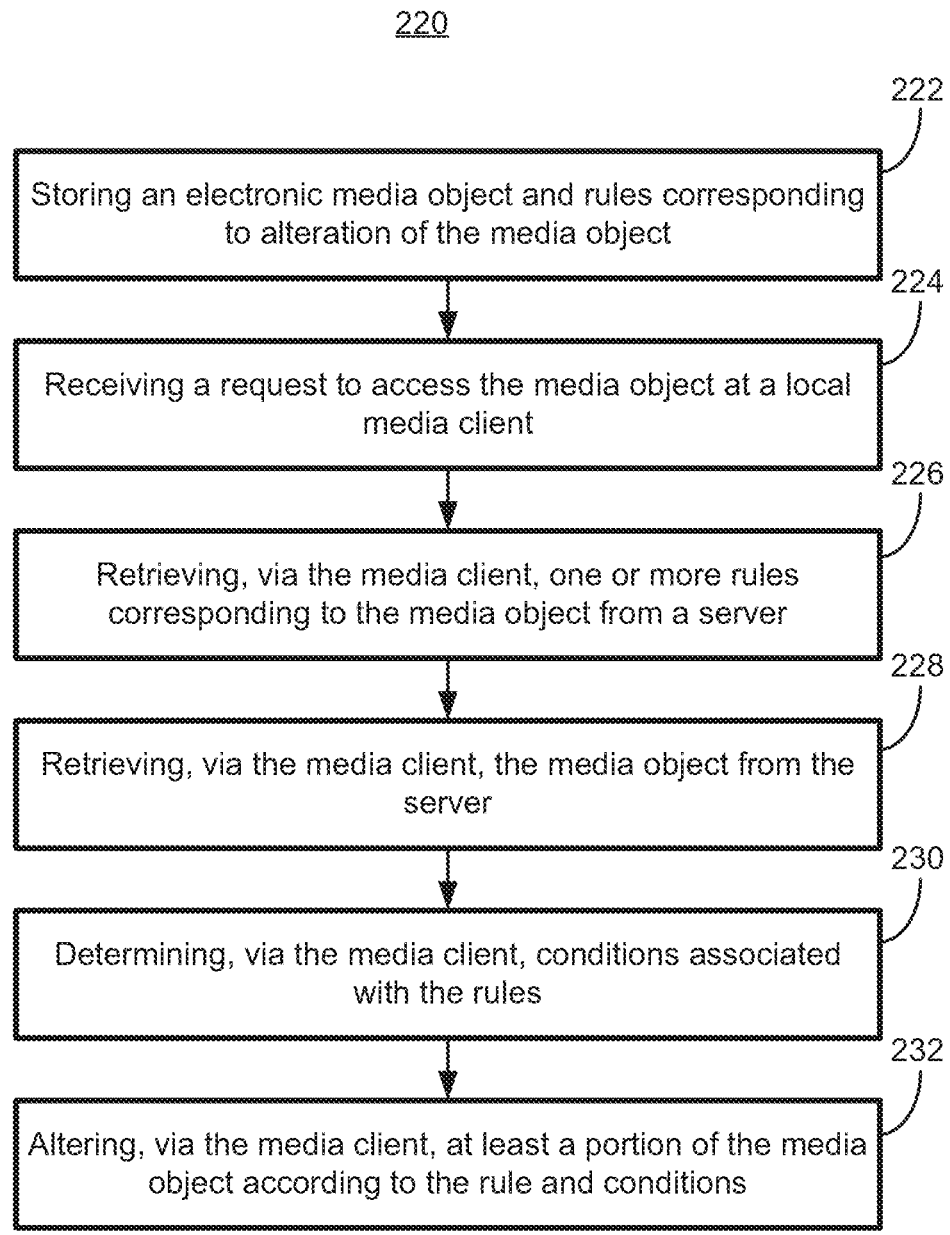
FIG. 15 is a flow chart illustrating a method of processing electronic media objects based on a context of the retrieval, according to another embodiment.

FIG. 15 shows a flow chart illustrating a method 220 of processing electronic media objects based on a context of the retrieval, particularly in view of the system embodiment shown in FIG. 2. At stage 222, as described above with respect to FIG. 5, the media object 110 and media object processing rules 112 associated with the media object 110 may be stored via a server 144 on a storage media 146.

At stage 224, a request to access the media object 110 may be received. In an embodiment, the request may be received at the media client 156. At stage 226, the media client 156 may retrieve media object processing rules 112 associated with the media object 110 from a server 144. At stage 228, the media client 156 may retrieve the media object 110.

At stage 230, the media client 156 may determine the conditions associated with the rules, that is, conditions discussed above such as a location from which the request originated. In some cases, conditions such as a number of times the media object 110 has been accessed may be retrieved from the server 144, while others, like location or the age of the media object 110 may be determined locally at the media client 156.

At stage 232, the media client 156 may produce the altered media object 111 for presentation. The altered media object 111 may be presented via the media client 156, but in other embodiments, the altered media client 111 may be presented by another application or device.

Figure 16:
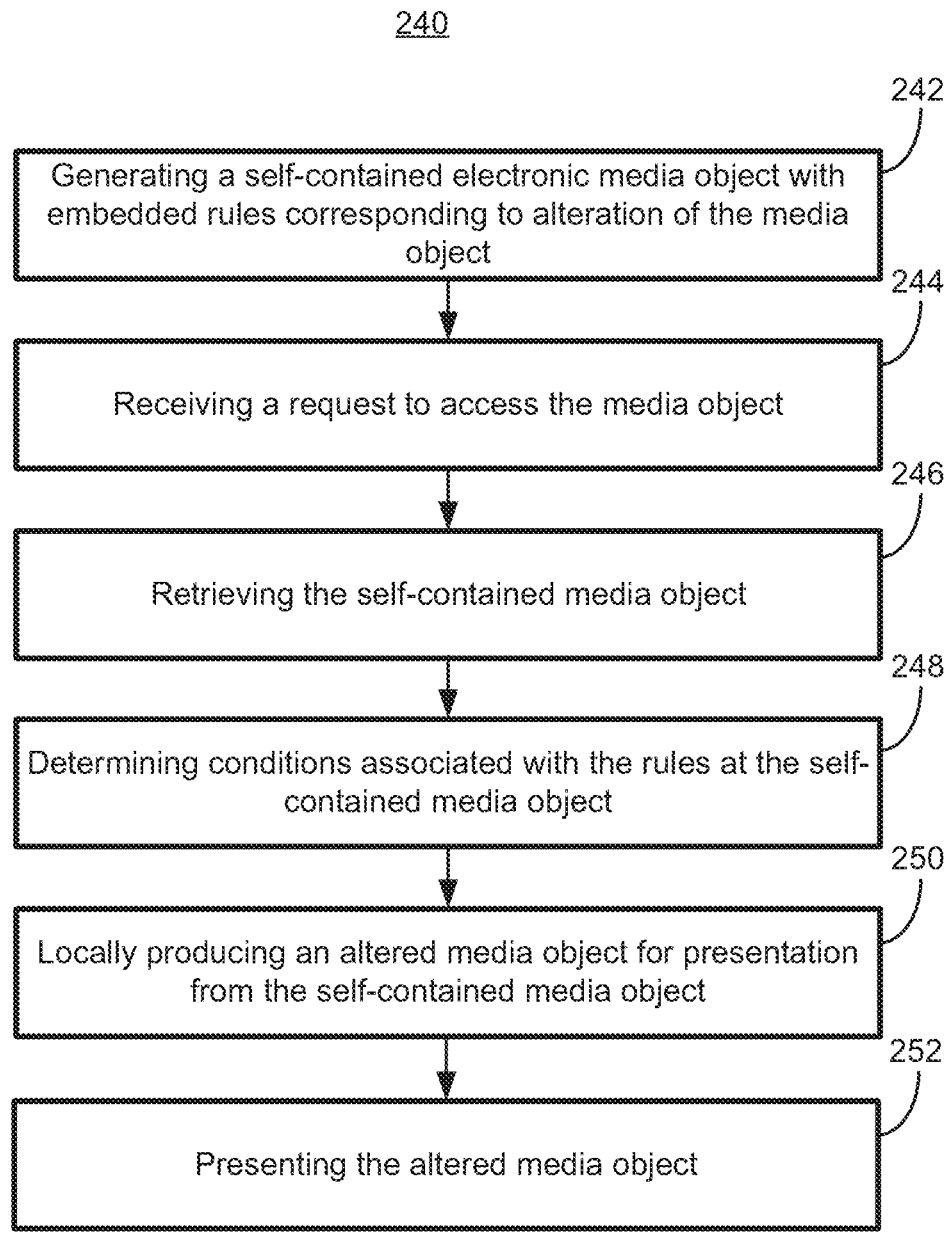
FIG. 16 is a flow chart illustrating a method of processing electronic media objects based on a context of the retrieval, according to yet another embodiment.

FIG. 16 is a flow chart illustrating a method 240 of processing electronic media objects based on a context of the retrieval, particularly in view of the system embodiment shown in FIG. 3. At stage 242, as discussed above with respect to FIG. 3, an original media object 103 may have rules assigned with a rule assignment service 126 and then be converted with an object generation program or service 190 to produce a self-contained media object 178 with embedded rules and executable code 180 for creating an altered media object 111.

In an embodiment, the media object 178 is generated in a secure manner and media object 178 is generated to be cryptographically verifiable. For example, media object 178 or a portion thereof may be encrypted so as to be decryptable by a system to which media object 178 is presented. For example, media object 178 or a portion thereof may be encrypted using a public key of a public/private key pair where the private key of the public/private key pair is securely maintained by a system that analyzes media object 178 for verification. Media object 178 may be encrypted by the public key itself or in other ways utilizing the public key.

For example, a symmetric cryptographic key may be generated and used to encrypt media object 178 and the public key may be used to encrypt the cryptographic symmetric key. The encrypted symmetric cryptographic key may be provided as part of media object 178 so that a system that processes media object 178 for the purpose of using and presenting media object 178 may use its copy of the private key corresponding to the public key to decrypt the symmetric key and then use the symmetric key to decrypt media object 178. Other variations are also considered as being within the scope of the present disclosure, including encryption of media object 178 using a symmetric cryptographic key maintained as a secret shared between the system that encrypted media object 178 and a system to which media object 178 is presented for verification. Further, various embodiments may utilize different layers of encryption, and the verification of media object 178 may be performed by a distributed system having multiple components, each of which is able to access some, but not necessarily all, information in media object 178 through decryption.

Media object 178 may be cryptographically verifiable in other ways, such as with the use of digital signatures. Some or all of media object 178 may be digitally signed using a key such that a digital signature of media object 178 is verifiable by a system that processes media object 178. In one example, some or all of media object 178 may be digitally signed using a private key of a public/private key pair. A certificate corresponding to the private key may be provided as part of, or otherwise with, media object 178 so that a system processing media object 178, for the purpose of using, altering, and presenting, may utilize a public key corresponding to the private key and may communicate with a certificate authority to verify the authenticity of the certificate provided. Other variations, including variations in which symmetric cryptographic keys shared between a user device and the system that verifies media object 178 may be used to encrypt and/or digitally sign some or all of media object 178.

Figure 17:
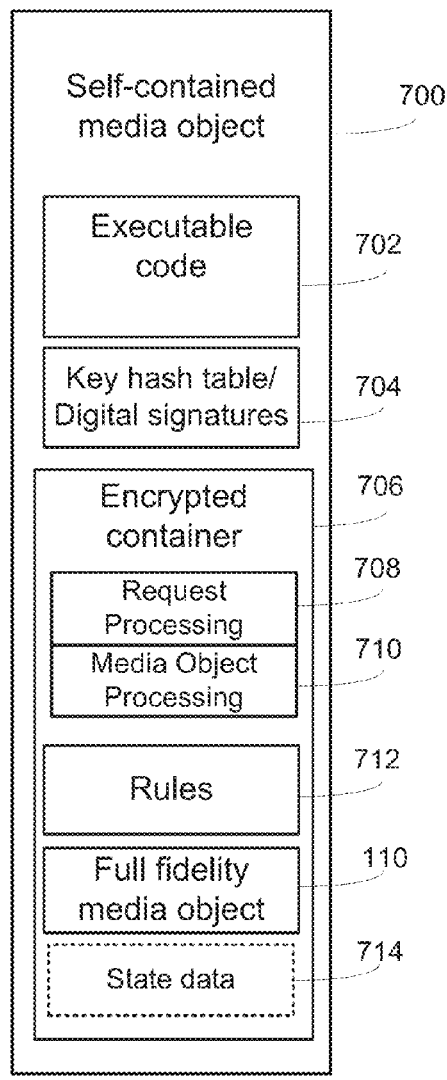
FIG. 17 is a block diagram of a structure of a self-contained media object, according to one embodiment.
Figure 18:
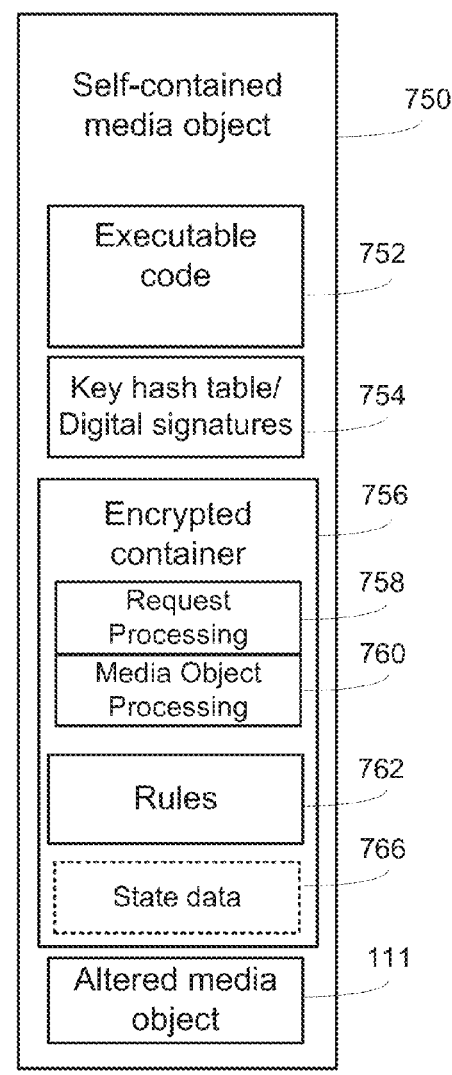
FIG. 18 is a block diagram of a structure of a self-contained media object according to another embodiment.

Turning briefly to FIG. 17 and FIG. 18, two variations of self-contained media objects are discussed. In FIG. 17, a self-contained media object 700 has executable code 702 and a key or password hash table 704. In other embodiments, the table 704 may include digital signatures. An encrypted container 706 may include request and media object processing code 708 and 710, respectively, that determine information related to the request and process a media object 110 into an altered media object 111. Rules 712 may be used by the request and media object processing functions 708 and 710, respectively, to create the altered media object 111 from a full fidelity media object 110. In an optional embodiment, state data 714 used to determine the conditions associated with the request, such as an origin location of the request or an age of the media object 110 may also be included in the self-contained media object 700.

FIG. 18 illustrates another embodiment of a self-contained media object 750. In this embodiment, executable code 752, a key hash table or digital signature 754, and an encrypted container 756 may be present, similar to the embodiment of FIG. 17. Also in FIG. 18, request processing code 758 and media object processing code 760 may be present, but instead of using the rules 762 and state data 766 to produce an altered media object 111, as in FIG. 17, the rules 762 and media object processing code 760 may take an altered media object 111, outside the encrypted container 756, and create a full fidelity media object 110 when the appropriate conditions are met. That is, the rules may contain an algorithm that reverses previously applied effects so that the original media object 103 can be re-created. In this embodiment, the altered media object 111 is not protected as such, but the ability to re-create the full fidelity media object 110 uses code that is protected by a password, key, or other token.

In embodiments where concerns about reverse engineering or hacking of a self-contained media object such as media object 700 are not a particular issue, the media objects 700 may not be encrypted, but digitally signed so that their integrity can be checked by the executable code 702 prior to code execution. In this variation, the full fidelity media object 110 may be exposed so that a determined person may be able to circumvent the intended protection and obtain unrestricted access the full fidelity media object 110.

Returning to FIG. 16, at stage 244, a request may be received at the server 174 to access the media object 178. At stage 246, the self-contained media object 700 may be retrieved from the storage medium 176 and stored at the client device 182.

At stage 248, the self-contained media object 178 may be executed at the client device 182. Execution of the self-contained media object 178 may require a user or other service that requested the media object 178 to input a key or password. Alternatively, the self-contained media object 178 itself may verify a digital signature to ensure the integrity of the self-contained media object 178. When used with asymmetric keys, verification of the public key with a certificate authority may be performed. Further execution of the code in the self-contained media object 178 causes the conditions associated with the request (e.g., location of the request, age of the media) to be determined and, in accordance with the embedded rules 712 and 762, to produce an altered media object 111 at stage 250.

At stage 252, the altered media object 111 may be presented via an appropriate mechanism, such as a video or audio player.

Figure 19:
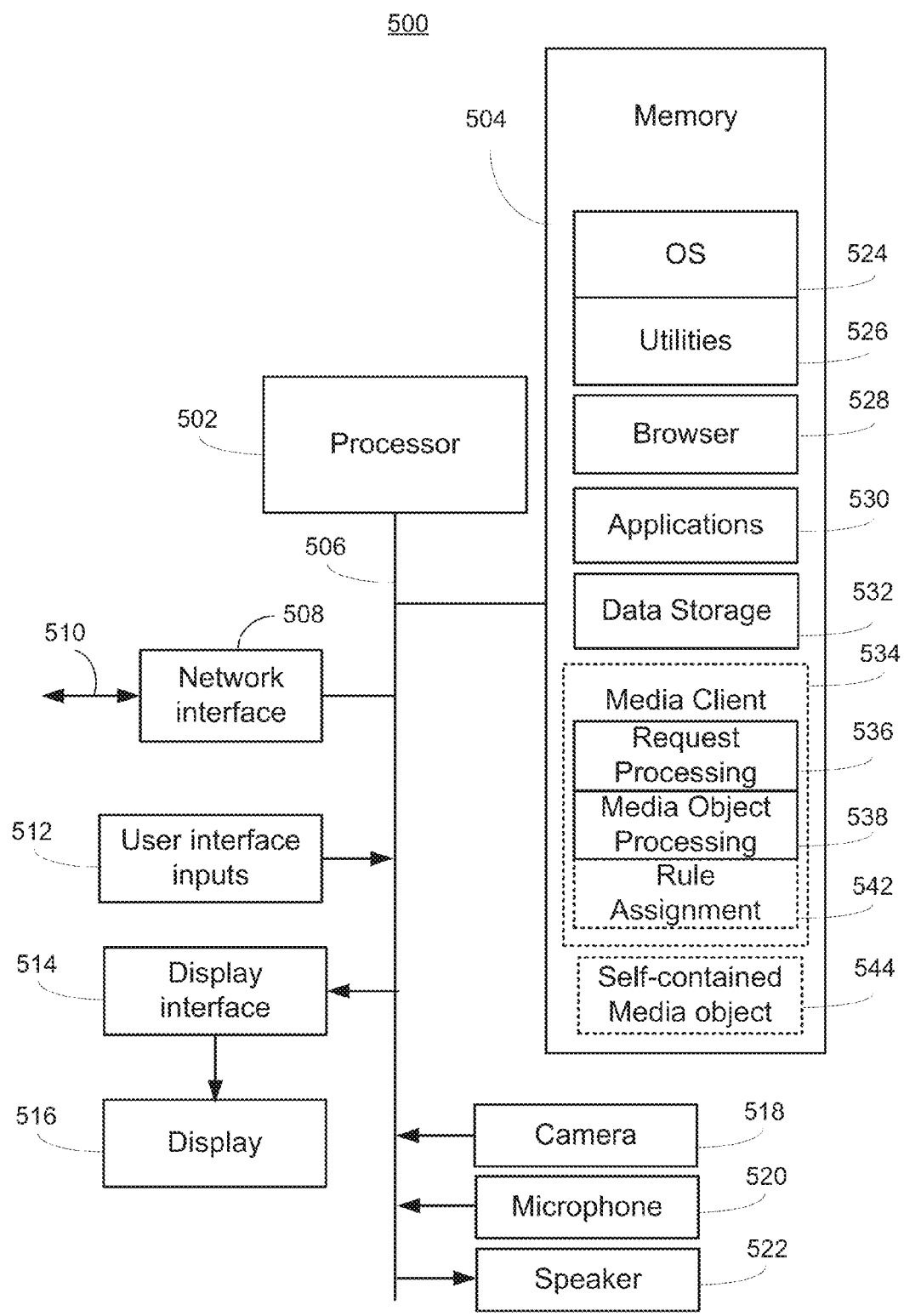
FIG. 19 is a block diagram of a client device, according to one embodiment.

FIG. 19 is a block diagram of a representative client device 500 similar to or the same as client devices 102, 104, 154, 155, or 182 suitable for use in supporting context-specific electronic media processing. The client device 500 may be embodied in the form of a desktop computer, a laptop computer, a personal digital assistant, a cellular telephone, a smartphone, a set-top box, a music player, a web pad, a tablet computer system, a game console, an electronic book reader, or other device with sufficient capability. The client device 500 may include a processor 502 and a memory 504, coupled by a data bus 506. The processor 502 may be any of a number of architectures optimized for the type of device.

The memory 504 may be any combination of non-transient computer-readable storage media. Specific examples of non-transient computer-readable media include, without limitation, optical and magnetic disc drives, flash memories, disc arrays, solid state memories, EEPROMs, and other physically embodied memory devices and structures. The term "non-transient" when used as a modifier to such media denotes media that are physically embodied in a fixed form (e.g., a disc or device, as opposed to in an ephemeral form, such as an electronic or electromagnetic wave).

The client device 500 may include a network interface 508 coupled, in some embodiments, to a physical network 510. In other embodiments, the network interface 508 may be for a wireless network so that no external physical network is present. The network interface 508 may include, but is not limited to, wired or wireless IP connections, such as IEEE 802.11x (Wi-Fi®). The network interface may also include other local and wide area connections such as Bluetooth®, WiMax, or 4G LTE.

The client device 500 may include user interface inputs 512 including, but not limited to, a touchscreen, keyboard, keypad, trackball, or other pointing device, such as a mouse. A display interface 514 may process data in a known manner for use by a display 516. In various embodiments, the display 516 may be part of the client device 500, as with a cell phone, or may be external to the client device 500, as with a desktop computer. The display 516 may comprise, for example, one or more devices such as a liquid crystal display (LCD), gas plasma-based flat panel display, organic light emitting diode (OLED) display, electrophoretic ink (E ink) display, LCD projector, or other types of display device.

The client device 500 may include a camera 518, microphone 520, and speaker 522 or other audio output device for use in various contexts such as recording video content, making phone calls, or holding video conferences.

The memory 504 may store various executable instructions for use in operating the client device 500. For example, the memory 504 may store an operating system 524 and utilities 526 that provide basic services including user interface, memory management, networking, and diagnostics. The client device 500 may also have programs such as one or more browsers 528 and other applications 530 that may be configured to provide various services such as a media player application and/or other executable logic.

The one or more browsers 528 may support common Web constructs and may include Silk™, Internet Explorer®, Chrome™, Firefox®, Safari®, and other known browsers. The one or more browsers 528 may include or use various plug-ins or other specialized applications for use, among other things, in presenting media content or supporting particular hardware.

The applications 530 may be executed in a client device 104, for example, to access network content served up by services that provide access to media sales and distribution services as well as distributed storage services and/or other servers, thereby rendering a user interface on the display. The applications 530 may, for example, correspond to browsers, mobile applications, social networking applications, email applications, shopping applications, productivity applications, and media applications, and the user interface may correspond to a network page or a mobile application screen.

The memory 504 may also include data storage 532, which may be used to store files, settings, intermediate results including both original media objects 103 and altered media objects 111.

In particular embodiments, the memory 504 may also store, in various embodiments, a media client 534 that may be the same as or similar to media client 156 of FIG. 2. The media client 534 may include, among other program code, a request processing module 536, a media processing module 538, and optionally, a rule assignment module 542.

In yet other embodiments, the memory 504 may include a self-contained media object 544, the same as or similar to the media object 178 of FIG. 3. The self-contained media object 544 may be directly executable by the processor 502 to provide an altered media object 111, as discussed above. Other variations of the client device 500 are possible based factors including device type, system architecture, and operating environment.

Figure 20:
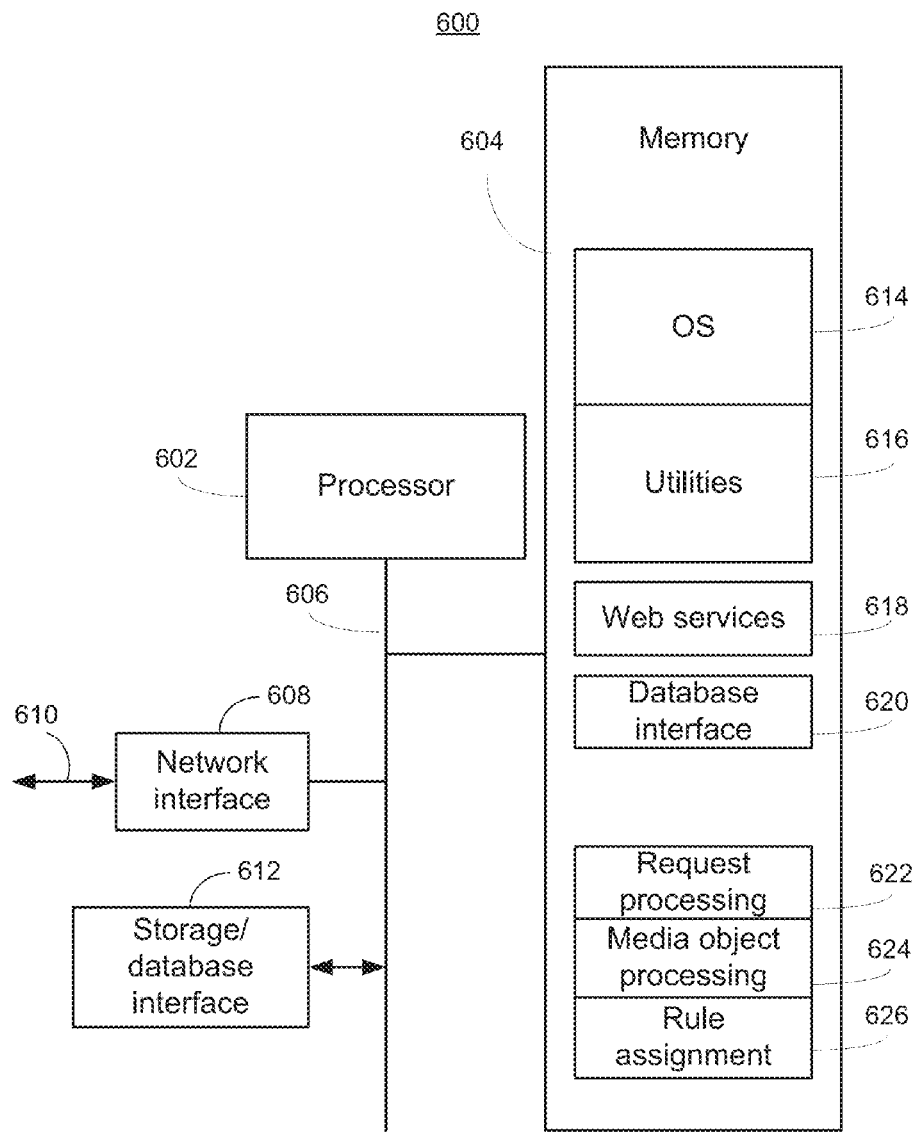
FIG. 20 is a block diagram of a server device, according to one embodiment.

FIG. 20 is a block stage diagram of an embodiment of a server 600 suitable for use in context-specific electronic media processing. The server 600 may include a processor 602 and a memory 604 coupled by a data bus 606. In various embodiments, the processor 602 may be an array of individual processors, and the data bus 606 may be configured for very high speed data transfers among distributed memories (not depicted).

The server 600 may include a network interface 608 that may be coupled directly to a network 610 or may be coupled to additional functional blocks including, but not limited to, load balancers, firewalls, and edge servers. Similarly, the server 600 may include a storage or database interface 612 that may connected directly or indirectly with mass storage devices, such as storage medium 108 of FIG. 1 or other components such as a database (not depicted).

The memory 604 may include executable instructions, including, but not limited to, an operating system 614 and utilities 616 used, for example, for diagnostics. The memory 604 may also include other service-oriented programs such as support for web services 618 and/or a database interface 620.

With respect to context-specific electronic media processing, the memory 604 may also include code that supports request processing 622, media object processing 624, and rule assignment 626, as discussed above. The description of the server 600 is not intended to be a comprehensive illustration of all aspects of a server but rather provides a context for understanding the current disclosure.

Context-specific electronic media object processing benefits both content owners or stakeholders and service providers wishing to offer unique capabilities to their users. This capability allows a content owner to set rules for making real-time alterations to media object options from personal information security to whimsical challenges. A person with family photographs who wishes to avoid widespread distribution but who also wishes to avoid requiring acceptable viewers to create and maintain cumbersome login accounts may set geographic bounds for full access to a media object and less-than-full access to others outside the geographic bounds.

At the other end of the spectrum, a content owner may wish to set up a "treasure hunt" where the first person (or the first thousand) to access a particular media object may receive a full fidelity copy of the media object and subsequent persons finding the media object receive successively lower fidelity copies.

A rule assignment service for specifying conditions and actions associated with a media object may simplify the rule-making process by providing a user interface with clearly identified options for selecting or creating both conditions and actions. A service provider may offer a value added service that allows creating rules and hosting media objects for distribution via the service. The service provider may enforce the rules via a server-based process that controls access to the media object. The service provider or other entity may also offer a media client 156 that enforces the rules locally at a client device 154. Alternatively, a service may allow creation of self-contained, self-enforcing media objects 178 that can be distributed outside the bounds of a server-based service or custom media client.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A system for modifying an image based on a property associated with a request for the image, the system comprising:
    at least one hardware computing device configured to implement one or more services, wherein the one or more services are configured to:
    receive a request to access an image;
    determine a geographic location associated with the request;
    determine one or more rules associated with the image, the one or more rules specifying the geographic location associated with the request and a corresponding modification to be made based on a distance between the geographic location and a predetermined location;
    determine, based at least partially on correspondence between the geographic location associated with the request and the geographic location specified by the one or more rules, the corresponding modification for use in modifying the image; and
    modify one or more of a color, a clarity, or a resolution of at least a portion of the image based on the corresponding modification.

2. The system of claim 1, wherein the one or more rules further specify a number of times the image has been requested and the corresponding modification comprises reducing an aspect of a quality of the image based on the number of times.

3. The system of claim 1, wherein the one or more services are further configured to:
    determine the geographic location associated with the request based at least partially on an Internet Protocol (IP) path associated with a device making the request; and
    determine correspondence between the IP path and one or more of a predetermined number of hops or a network transport cost identified in the one or more rules,
    the corresponding modification further based at least partially on the correspondence between the IP path and the one or more of the predetermined number of hops or the network transport cost.

4. The system of claim 1, wherein the modifying the one or more of a color, a clarity, or a resolution of the at least a portion of the image includes blurring the at least a portion of the image or altering a color scheme for the at least a portion of the image.

5. A method, comprising:
    receiving a request to access a media object, the request having at least one characteristic;
    determining a rule that specifies one or more modifications to apply to the media object based on a number of times the media object has been requested, wherein the one or more modifications include progressively reducing an aspect of a quality of at least a portion of the media object for each successive request for the media object; and
    generating an altered media object, via a computing device, the altered media object having the at least the portion of the media object modified according to the rule.

6. The method of claim 5 further comprising:
    receiving the media object from a client device;
    receiving the rule that specifies the one or more modifications to apply to the media object; and
    storing the media object and the rule.

7. The method of claim 5, wherein the media object is one of a video media object, an audio media object, or an image media object.

8. The method of claim 5, further comprising:
storing the altered media object for use in a subsequent retrieval;
receiving a subsequent request to access the altered media object;
determining the rule for processing the altered media object; and
modifying the altered media object according to the rule responsive to the subsequent request.

9. The method of claim 5, wherein the rule further specifies a geographic location associated with the request and the one or more modifications are further based on a distance between the geographic location and a predetermined location identified in the rule.

10. The method of claim 5, wherein reducing the quality of the media object includes one or more of lowering a resolution of an image media object, reducing a video bitrate of a video media object, reducing an audio bitrate of an audio media object, blurring at least a portion of the image media object, changing a color in the media object, altering the image media object with a color-adjusted theme, shortening a presentation length of the video media object, or shortening a presentation length of the audio media object.

11. The method of claim 5, wherein the one or more modifications specified by the rule include altering the at least a portion of the media object to replace a first undistorted image feature with a second undistorted image feature to reduce fidelity of the at least a portion of the media object without distorting an image.

12. The method of claim 5, wherein the one or more modifications specified by the rule include blurring one or more human faces in the media object.

13. The method of claim 5, wherein the one or more modifications specified by the rule include reducing a presentation length of a video media object or an audio media object.

14. The method of claim 5, wherein the one or more modifications specified by the rule include reducing a quality of at least a portion of an image media object.

15. A computer-readable memory storing computer-executable instructions that when executed on a processor of a computer cause the computer to perform steps comprising:
in response to receiving a request to view a media object, determining, via the processor, correspondence between information associated with the request and a rule associated with the media object, wherein the information includes a count of instances that the media object was accessed and the rule specifies an alteration to the media object, the alteration including a greater reduction in fidelity as the count of instances increases;
determining, via the processor, the alteration to the media object based at least partially on the correspondence between the information in the request and the rule associated with the media object; and
applying, via the processor, the alteration to the media object by reducing the fidelity of at least a portion of the media object.

16. The computer-readable memory of claim 15, wherein the information further comprises a distance in a social media graph based on a degree of separation between an identity specified in the rule and an identity of a requestor associated with the request.

17. The computer-readable memory of claim 15, wherein the media object is part of an object that also incorporates the rule and a media processing executable code that performs a comparison of the information in the request to the rule, selects the alteration, and applies the alteration to the media object to produce an altered media object.

18. The computer-readable memory of claim 17, wherein the object stores at least the media object, media object processing code, or the rule in an encrypted container.

* * * * *